(12) United States Patent  
Foister et al.

(10) Patent No.: US 8,327,984 B2
(45) Date of Patent: Dec. 11, 2012

(54) MAGNETORHEOLOGICAL (MR) PISTON ASSEMBLY WITH PRIMARY AND SECONDARY CHANNELS TO IMPROVE MR DAMPER FORCE

(75) Inventors: Robert T. Foister, Rochester Hills, MI (US); Thomas W. Nehl, Shelby Township, MI (US); William C. Kruckemeyer, Beavercreek, OH (US); Oliver Raynauld, Senils (FR)

(73) Assignee: BWI Company Limited S.A., Luxembourg (LU)

( * ) Notice: Subject to any disclaimer, the term of this patent is extended or adjusted under 35 U.S.C. 154(b) by 484 days.

(21) Appl. No.: 12/609,395

(22) Filed: Oct. 30, 2009

(65) Prior Publication Data

US 2011/0100775 A1     May 5, 2011

(51) Int. Cl.
 *F16F 9/53* (2006.01)
(52) U.S. Cl. .............. 188/267.2; 188/267; 267/140.14
(58) Field of Classification Search ........... 188/267, 188/267.1, 267.2, 322.15, 322.22; 267/140.14, 267/140.15
See application file for complete search history.

(56) References Cited

U.S. PATENT DOCUMENTS

| | | | |
|---|---|---|---|
| 5,492,312 A * | 2/1996 | Carlson ............... | 267/140.14 |
| 5,878,850 A * | 3/1999 | Jensen ............... | 188/267 |
| 5,878,851 A * | 3/1999 | Carlson et al. ....... | 188/269 |
| 6,311,810 B1 * | 11/2001 | Hopkins et al. ....... | 188/267.2 |
| 6,318,519 B1 | 11/2001 | Kruckemeyer et al. | |
| 6,318,520 B1 | 11/2001 | Lisenker et al. | |
| 6,464,049 B2 | 10/2002 | Lisenker | |
| 6,612,409 B2 | 9/2003 | Lun et al. | |
| 6,637,556 B1 * | 10/2003 | Lun ................. | 188/267 |
| 6,786,311 B2 | 9/2004 | Lun et al. | |
| 6,874,603 B2 | 4/2005 | Lisenker et al. | |
| 2004/0195062 A1 * | 10/2004 | Anderfaas et al. ..... | 188/267.2 |
| 2008/0251982 A1 * | 10/2008 | Sekiya et al. ......... | 267/140.14 |

* cited by examiner

*Primary Examiner* — Robert A Siconolfi
*Assistant Examiner* — Stephen Bowes
(74) *Attorney, Agent, or Firm* — Dickinson Wright PLLC

(57) ABSTRACT

A magnetorheolgical (MR) damper includes a piston assembly having a primary channel disposed along a longitudinal axis and contained in a cylinder. MR fluid is also contained in the cylinder. The piston assembly having a primary channel, or primary channel MR piston assembly, includes a piston body having a first end axially spaced from a second end and defining a hole therethrough. The primary channel is defined in an outer body surface of the piston body from the hole at the second end to a coil groove in the outer body surface about the axis. A secondary channel is defined in the outer body surface from the coil groove towards the first end to improve MR damper force performance at low primary channel MR piston assembly velocities.

19 Claims, 10 Drawing Sheets

MAGNETORHEOLOGICAL (MR) PISTON ASSEMBLY WITH PRIMARY AND SECONDARY CHANNELS TO IMPROVE MR DAMPER FORCE

TECHNICAL FIELD

This invention relates to a magnetorheological (MR) damper used for controllable damping applications that includes a MR piston assembly with primary channel(s) for wire routing, more particularly, a secondary channel is defined in a piston body of the primary channel MR piston assembly, and a length of the secondary channel from a groove defined in the piston body about an axis of the piston body towards a first end of the piston body improves MR damper force performance particularly at low MR piston assembly velocities.

BACKGROUND OF INVENTION

Conventional piston dampers also include magnetorheological (MR) dampers. MR dampers include a cylinder that contains an MR fluid. An MR piston slideably engages the interior of the cylinder. A first end of a rod is attached to the MR piston and a second end of the rod extends outside the cylinder. The rod and the cylinder are attached to two separate structures to restrain, or dampen, relative motion of the two structures along a direction of travel of the MR piston. Dampening forces are generated within the cylinder of the MR damper that oppose the movement of the rod and the MR piston along the axis of the MR damper.

MR fluids are made up of microscopic metallic particles, a carrier fluid, and stabilizers. The microscopic metallic particles, such as iron, are suspended in the carrier fluid. The microscopic metallic particles in the MR fluid may have a range in size from 0.1 to 10 micrometer and have a shape that appears as ellipsoids or scale spheres when viewed by the human eye upon magnification. If the metallic particles are too large, the metallic particles may settle out from being suspended in the MR carrier fluid. If the metallic particles are too small, the desired magnetic effect on the metallic particles begins to diminish. The typical MR fluid consists of 20-40% microscopic metallic particles by volume of MR carrier fluid. The carrier fluid in the MR fluid may be a type of oil such as hydrocarbon oil, silicone oil, and ester oil. Preferably, hydrocarbon oils are used in MR fluids. Hydrocarbon oils have a desired high lubricity and are available in a wide range of viscosities. Stabilizing agents are additives in the carrier fluid that inhibit the gradual gravitational settling of the metallic particles. If the metallic particles settle in the MR fluid, the stabilizing agent aids to keep the metallic sediment from becoming compacted. If compaction of the metallic sediment occurs, remixing the metallic sediment randomly back within the MR fluid becomes difficult. A low vapor pressure for the MR fluid is also desirable so the MR fluid does not easily evaporate. The MR fluid should be suitable to operate over a wide range of temperatures.

The MR fluid exhibits selectively controlled fluid behavior in the presence of an applied magnetic field. When a magnetic field is not applied to the MR fluid, the microscopic metallic particles are randomly suspended in the MR fluid. In the absence of the magnetic field, the MR fluid has a low viscosity and exhibits liquidity. When a magnetic field is applied to the MR fluid, the microscopic metallic particles form particle chains in the MR fluid within a matter of milliseconds. The particle chains generally align in the direction of magnetic flux of the applied electric field. The formation of the particle chains alters the MR fluid characteristics from a liquid state to a quasi-solid state having increased viscosity and exhibiting behavior similar to a viscoelastic material. A viscoelastic material exhibits both viscous and elastic characteristics when undergoing deformation. Viscous materials resist shear flow and strain linearly with time when a stress is applied. Elastic materials strain instantaneously when stretched, but quickly return to their original state once the stress is removed. The MR fluid, acting as a viscoelastic material in the presence of a magnetic field, exhibits both of these properties. The MR fluid also exhibits time dependent strain characteristics.

In MR damper operation, the MR fluid passes through an opening in the MR piston while the piston travels with reciprocal velocity movement in the cylinder. The MR fluid in the opening is exposed to a varying magnetic field generated by providing a varying electric current to an electrical coil disposed in the MR piston. The piston, formed of a metallic soft magnetic material in conjunction with the electrical coil, forms an electromagnet. The electromagnet applies the magnetic field to the MR fluid in the cylinder. Application of the magnetic field causes the microscopic metallic particles in the MR fluid to form chains in the opening that generally align in the direction of magnetic flux and perpendicular to the flow of MR fluid flowing through the piston. The chains of microscopic metallic particles restrict the movement of MR fluid through the opening in the piston and result in an increase in yield stress of the MR fluid. An increase in yield stress of the MR fluid results in an increase in force in the MR damper. As understood by one skilled in the art, the electric current applied to the electromagnet may be varied to produce varying force operating conditions of the MR fluid at varying piston velocities of the MR damper. Thus, a varied damping effect of the MR piston may be produced. A varied damping effect allows for variably-controlled damping of relative motion between the MR piston and the cylinder to be realized. The damping performance of a MR damper in a suspension system is largely dependent on the force-versus-piston assembly velocity characteristics of the MR damper. The variably-controlled damping performance of the MR damper may be measured and evaluated using a damper force-versus-piston assembly velocity curve.

It is known, according to prior art U.S. Pat. No. 6,612,409 issued on Sep. 2, 2003, and referring to FIGS. 1-2, that a MR damper (10) includes a MR piston assembly with a primary channel used for wire routing (12) disposed in the cylinder (14) about a longitudinal axis A. Hereafter, the MR piston assembly with a primary channel for wire routing will be referred to as a "primary channel MR piston assembly." A MR fluid (16) is also disposed in the cylinder (14). The primary channel MR piston assembly (12) includes a coaxial piston body (18). A coaxial annular structure (20) about the piston body (18) defines an annular substantially magnetically energizable MR-fluid passageway (22). The piston body (18) further includes a first end (24) and a second end (26) axially spaced from the first end (24). A first end plate (28) is attached to the first end (24) and a second end plate (30) is attached to the second end (26). The piston body (18) defines a coaxial hole (32) therethrough. The piston body (18) includes an outer body surface (34). The piston body (18) defines a circumferential coil groove (36) about the axis A in the outer body surface (34). A primary channel (38) is also defined in the outer body surface (34) from the hole (32) at the second end (26) to the coil groove (36). The primary channel (38) includes a first primary channel portion (39) and a second primary channel portion (39A). The first primary channel portion extends from the second end (26) to the coil groove (36). The second primary channel portion (39A) is disposed in the second end (26) extending from the hole (32) in the second end (26) to the first primary channel portion (39). An electrical conductor (40) is disposed in the hole (32) at the second end (26) and routed through the primary channel (38) and into the coil groove (36). The electrical conductor (40) is further configured to form an electrical coil (42) in the coil groove (36). The hole (32) at the second end (26), the primary channel (38), and the coil groove (36) are filled with a non-magnetic material (44) to effectively seal the electrical conductor (40) and the electrical coil (42) therein. A coaxial rod (46) is connected at the first end (24) and includes a coaxial opening (48) therethrough. Rod (46) is connected to piston body (18) via retention ring (35) at first end plate (28). The opening (48) includes electrical conductor means for supplying electrical current to the piston body (18) via the electrical conductor (40) and the electrical coil (42). An electrical connection means (50) in electrical connection to a power source external to the MR damper supplies power to the piston body (18) via the electrical conductor (40) and the electrical coil (42). The piston body (18) may further include one or more substantially magnetically non-energizable MR-fluid passageways (52), or by-pass holes, spaced apart from the axis A and outbound from the hole (32). The MR fluid (16), flowing through the cross-sectional area of the magnetically energizable passageway (22) and the magnetically non-energizable passageways (52), is designed so as to meet performance requirements for a specific MR damper application.

The damper force-versus-piston assembly velocity performance curve for the primary channel MR piston assembly in the MR damper depicts MR fluid force data represented along the y-axis and primary channel MR piston assembly velocity data represented along the x-axis. A damper force-versus-primary channel MR piston assembly velocity curve intersects the force axis, or the y-axis, at a y-intercept value above zero when approached from the positive velocity side, and a y-intercept value below zero when approached from the negative velocity side. The wider the difference between the y-intercept value above zero and the y-intercept value below zero results in an increased undesired jump in force between the finite positive and finite negative values. For example, in a vehicle system where the MR damper is employed, the higher the undesired jump in force with each change of movement direction of the primary channel MR piston assembly, a higher value of an undesirable harshness to the vehicle ride may result. The undesired harshness in the ride of the vehicle may be negatively felt by an occupant of the vehicle. Ideally, a damper force-versus-primary channel MR piston assembly velocity performance curve established through the origin (x=0, y=0) is desired to minimize the undesired harshness component from disturbing the smooth ride of the vehicle.

As shown in the prior art in FIG. 1, a single bypass hole (52) defined in the primary channel MR piston assembly assists to lower the y-intercept point closer to the origin and may result in a smoother ride of the vehicle at low primary channel MR piston assembly velocities. However, an inclined ramp portion of the damper force-versus-primary channel MR piston assembly velocity curve subsequent to the y-axis intercept point generally includes at least two distinct inclined ramps segments, or ramp steps. Each distinct ramp step has a unique positive and decreasing slope value. The second step results in lower force capability between the step transition and kneepoint. The two-step incline ramp yields into a knee-point transitioning into a desired, performance curve having a relatively low positive slope at increased force values beyond the knee-point and across the mid-to-high primary channel MR piston assembly velocities.

What is needed is an improved MR damper having a primary channel MR piston assembly that minimizes the two-step inclined force ramp at low MR piston velocities and provides increased force capability.

SUMMARY OF THE INVENTION

In accordance with one embodiment of the invention, a magnetorheological (MR) damper has a longitudinal axis. The MR damper includes a coaxial cylinder containing a MR fluid. The MR damper further includes a primary channel MR piston assembly being coaxially disposed in the cylinder and adapted for being slidably engaging in the cylinder for axial reciprocal movement in the cylinder. The primary channel MR piston assembly includes a piston body that defines a coaxial hole therethrough. The piston body further includes an outer body surface and a first end and a second end axially remote from the first end. The first and the second ends of the piston body are generally perpendicular to the axis. The piston body further includes a first end plate that is attached to the first end and a second end plate that is attached to the second end. The piston body also includes a circumferential coil groove defined in the outer body surface about the axis and a primary channel defined in the outer body surface extending from the hole at the second end to the coil groove. The piston body also further includes an electrical conductor being disposed in the hole and the primary channel and being further configured to form an electrical coil disposed in the coil groove. The piston body yet further includes a nonmagnetic material configured to fill the primary channel and the hole at the second end effectively sealing the electrical conductor and the electrical coil therein. The primary channel MR piston assembly further includes an annular structure that generally surrounds the piston body about the axis and is attached to the piston body and defines a substantially magnetically energizable MR-fluid passageway having a parallel, annular spaced relationship about the axis. The primary channel MR piston assembly yet further includes a coaxial rod defining a coaxial opening therethrough. The rod is attached to the first end plate. The opening in the rod generally aligns with the hole in the piston body at the first end. The opening includes an electrical conductor means in electrical connection with the electrical conductor. The improvement in the MR damper is a secondary channel defined in the outer body surface of the piston body of the primary channel MR piston assembly. The secondary channel extends from the coil groove toward the first end and is filled with the nonmagnetic material. The secondary channel in the piston body of the primary channel MR piston assembly of the MR damper provides improved low velocity MR damper force performance.

In accordance with another embodiment of the invention, a magnetorheological (MR) damper has a longitudinal axis. The MR damper includes a coaxial cylinder that contains a MR fluid disposed therein. The MR damper further includes a multi-primary channel MR piston assembly coaxially disposed in the cylinder. The multi-primary channel MR piston assembly is adapted for being slidably engaging in the cylinder for axial reciprocal movement therein. The multi-primary channel MR piston assembly includes a piston body defining a coaxial hole therethrough. The piston body in the multi-primary channel MR piston assembly includes an outer body surface. The piston body further includes a first end and a second end axially remote from the first end and the first and the second ends are generally perpendicular to the axis. The piston body further includes a first end plate being attached to the first end and a second end plate being attached to the second end. The piston body further includes a first and second circumferential coil groove being defined in the outer body surface about the axis. The second circumferential coil groove in the piston body is defined in the outer body surface surrounding the axis proximate to the first end relative to the first circumferential coil groove. The second circumferential coil groove in the piston body does not overlap the first circumferential coil groove in the piston body. The piston body further includes a first primary channel defined in the outer body surface extending from the hole at the second end to the coil groove. The piston body further includes a second primary channel being defined in the outer body surface extending from the first coil groove to the second coil groove. The piston body also includes an electrical conductor being disposed in the hole and the first primary channel and the first coil groove and the second primary channel and the second coil groove. The electrical conductor is further configured to form a first electrical coil that is disposed in the first coil groove and a second electrical coil that is disposed in the second coil groove. The piston body also includes a nonmagnetic material configured to fill the first coil groove and the second coil groove and the first primary channel and the second primary channel and the hole at the second end to effectively seal the electrical conductor and the first and the second electrical coils therein. The piston body yet further includes a secondary channel being defined in the outer body surface extending from the second coil groove toward the first end. The secondary channel is filled with the nonmagnetic material. The multi-primary channel MR piston assembly further includes an annular structure generally surrounding the piston body about the axis and being attached to the piston body. The annular structure further defines a substantially magnetically energizable MR-fluid passageway having a parallel, annular spaced relationship about the axis. The multi-primary channel MR piston assembly yet further includes a coaxial rod defining a coaxial opening therethrough and being attached to the first end plate. The opening in the rod generally aligns with the hole in the piston body at the first end. The opening in the rod also includes electrical conductor means in electrical connection with the electrical conductor. The secondary channel provides improved low velocity MR damper force performance.

In accordance with a further embodiment of the invention, a method for improving low-velocity magnetorheological (MR) damper force performance is presented. The method includes the step of providing a MR damper having a longitudinal axis. The MR damper includes a coaxial cylinder containing a MR fluid therein. The MR damper also includes a primary channel MR piston assembly coaxially disposed in the cylinder and adapted for being slidably engaging in the cylinder for axial reciprocal movement therein. The primary channel MR piston assembly includes a piston body defining a coaxial hole therethrough. The piston body of the primary channel MR piston assembly includes an outer body surface. The piston body also includes a first end and a second end axially remote from the first end and the first and the second ends are generally perpendicular to the axis. The piston body further includes a first end plate being attached to the first end and a second end plate being attached to the second end. The piston body further includes a circumferential coil groove being defined in the outer body surface about the axis. The piston body further includes a primary channel in the outer body surface extending from the hole at the second end to the coil groove. The piston body further includes an electrical conductor being disposed in the hole and the primary channel. The electrical conductor of the piston body is further configured to form an electrical coil disposed in the coil groove. The piston body also includes a nonmagnetic material configured to fill the coil groove and the primary channel and the hole at the second end effectively sealing the electrical conductor and the electrical coil therein. The piston body yet further includes a secondary channel disposed in the outer body surface of the piston body and extending from the coil groove toward the first end. The secondary channel is filled with the nonmagnetic material. The primary channel MR piston assembly includes an annular structure generally surrounding the piston body about the axis and attached to the piston body. The annular structure of the primary channel MR piston assembly defines a substantially magnetically energizable MR-fluid passageway having a parallel, annular spaced relationship about the axis. The primary channel MR piston assembly yet further includes a coaxial rod defining a coaxial opening therethrough. The rod is attached to the first end plate and the coaxial opening in the rod generally aligns with the hole in the piston body at the first end, and the opening includes electrical conductor means in electrical connection with the electrical conductor. The MR damper includes a damper force-versus-primary channel MR piston assembly velocity performance operating range effective during MR damper operation. The primary and the secondary channels are effective to establish a base performance curve of the MR damper in the performance operating range. The base performance curve includes a first y-intercept value subsequently followed by a generally positive, single-slope incline ramp at low primary channel MR piston assembly velocities. The single-slope incline ramp yields into a first knee-point on the base performance curve. The first knee-point is positioned at a first primary channel MR piston velocity. The first knee-point transitions into a generally low positive slope incline ramp on the base performance curve. The low positive slope incline ramp spans the mid-to-high primary channel MR piston assembly velocities.

In accordance with yet a further embodiment of the invention, a magnetorheological (MR) damping system includes a controller and at least one MR damper in electrical connection with the controller, and the controller operatively controlling MR damper operation. The at least one MR damper has a longitudinal axis. The MR damper includes a coaxial cylinder containing a MR fluid. The MR damper further includes a primary channel MR piston assembly being coaxially disposed in the cylinder and adapted for being slidably engaging in the cylinder for axial reciprocal movement in the cylinder. The primary channel MR piston assembly includes a piston body that defines a coaxial hole therethrough. The piston body further includes an outer body surface and a first end and a second end axially remote from the first end. The first and the second ends of the piston body are generally perpendicular to the axis. The piston body further includes a first end plate that is attached to the first end and a second end plate that is attached to the second end. The piston body also includes a circumferential coil groove defined in the outer body surface about the axis and a primary channel defined in the outer body surface extending from the hole at the second end to the coil groove. The piston body also further includes an electrical conductor being disposed in the hole and the primary channel and being further configured to form an electrical coil disposed in the coil groove. The piston body yet further includes a nonmagnetic material configured to fill the primary channel and the hole at the second end effectively sealing the electrical conductor and the electrical coil therein. The MR damper further includes a secondary channel defined in the outer body surface of the piston body of the primary channel MR piston assembly. The secondary channel extends from the coil groove toward the first end and is filled with the nonmagnetic material. The primary channel MR piston assembly further includes an annular structure that generally surrounds the piston body about the axis and is attached to the piston body and defines a substantially magnetically energizable MR-fluid passageway having a parallel, annular spaced relationship about the axis. The primary channel MR piston assembly yet further includes a coaxial rod defining a coaxial opening therethrough and is also attached to the first end plate. An opening in the rod generally aligns with the hole in the piston body. The opening includes an electrical conductor means in electrical connection with the electrical conductor. The primary channel MR piston assembly including the secondary channel defined in the piston body improves MR damping system performance at low primary channel MR piston assembly velocities.

BRIEF DESCRIPTION OF THE DRAWINGS

This invention will be further described with reference to the accompanying drawings in which.

DETAILED DESCRIPTION OF THE PREFERRED EMBODIMENTS

Figure 1:
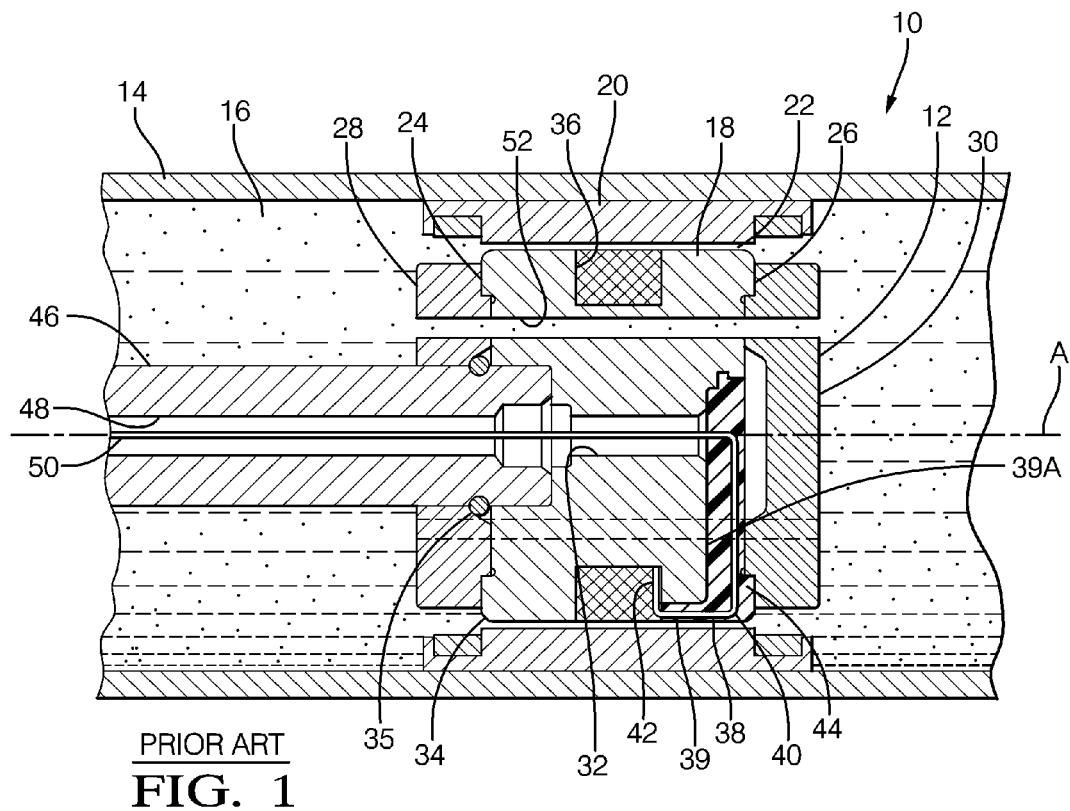
FIG. 1 is a longitudinal cross-section view of a prior art magnetorheological (MR) damper including a primary channel MR piston assembly further including a piston body and disposed in a cylinder containing MR fluid.
Figure 2:
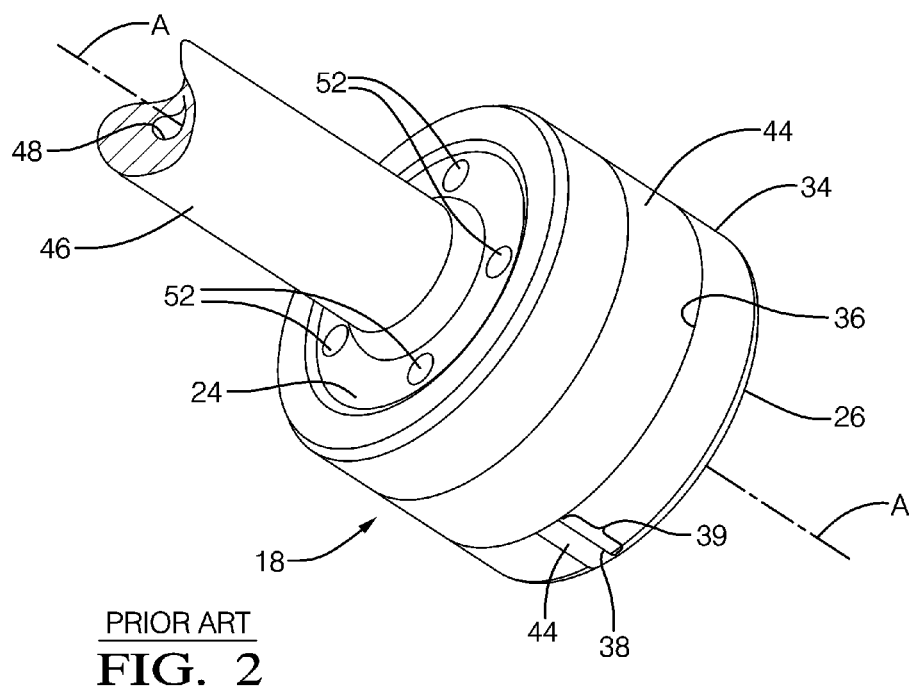
FIG. 2 is a pictorial view of a prior art piston body contained in the primary channel MR piston assembly of FIG. 1, showing details thereof.

In accordance with a first embodiment of this invention, referring to FIGS. 3-7, an MR damper 110 has a longitudinal axis A'. Damper 110 includes a coaxial cylinder 114. Cylinder 114 contains a MR fluid 116 therein. Fluid 116 may be any type of MR fluid known in the art for use in MR-type dampers. A cylindrical MR piston assembly with a primary channel for wire routing, or primary channel MR piston assembly 112 is coaxially disposed in cylinder 114. Cylinder 114 and primary channel MR piston assembly 112 may be formed from a variety of sufficiently rigid material(s) such as steel, aluminum, metal, metal alloy, composites and the like. Assembly 112 is adapted to be slidably engaging in cylinder 114 for axial reciprocal movement therein. To ensure slidable engagement, assembly 112 has a diameter size about the diameter size of cylinder 114.

Assembly 112 includes a piston body 118 defining a coaxial hole 132 therethrough. Piston body 118 may be formed from a low-carbon steel or similar soft magnetic material. Those skilled in the art will recognize that the nature of fluid 116 and constituent materials of assembly 112 may vary without limiting the scope of operation of the present invention.

Hole 132 is typically formed by a drilling operation. Piston body 118 is typically a cylindrical solid; however, the piston body may be other shapes without limiting the operation of the present invention. Body 118 has a diameter width that is less than the diameter of cylinder 114. Body 118 includes an outer body surface 134. Body 118 also includes a first end 124 and a second end 126 axially remote from first end 124. Ends 124, 126 are generally perpendicular to axis A'. Body 118 further includes a first end plate 128 adjacent to first end 124 and a second end plate 130 adjacent to second end 126.

Figure 3:
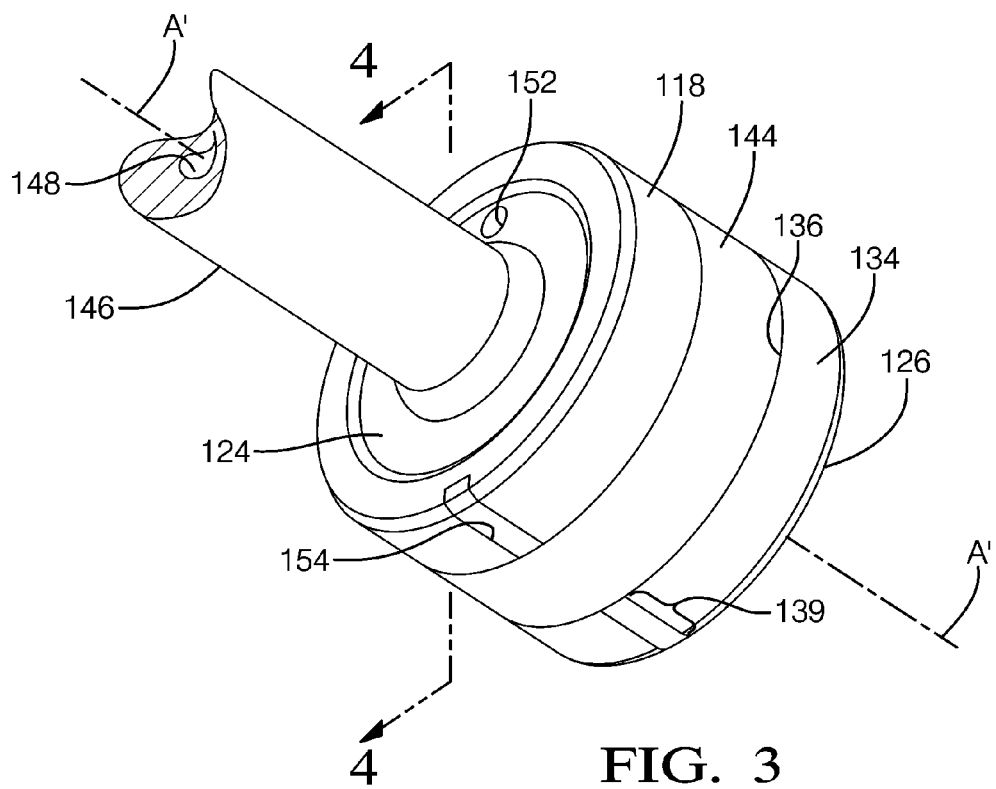
FIG. 3 is a pictorial view of a piston body in accordance with the present invention showing a primary channel, a secondary channel, and a substantially magnetically non-energizable MR-fluid passageway.

A circumferential coil groove 136 is defined in outer body surface 134 about axis A'. As depicted in FIG. 3, circumferential coil groove 136 is located about one-half the distance between first and second end 124, 126, and is about perpendicular to axis A'. Alternately, coil groove 136 may be disposed in an orientation other than the perpendicular orientation to axis A' at a distance other than one one-half the distance between first and second end. A primary channel 138 is defined in outer body surface 134 extending from hole 132 at second end 126 to coil groove 136. Primary channel 138 includes a first and second primary portion 139, 139A. First primary channel portion 139 extends from second end 126 to coil groove 136. Second primary channel portion 139A extends in second end 126 from hole 132 and aligns with first primary channel portion 139. Coil groove 136 and primary channel 138 may be formed in outer body surface 134 by machining or reaming out material from outer body surface 134. An electrical conductor 140 is disposed in hole 132 in second end 126. Conductor 140 is made of a metallic material suitable to conduct electrical current, preferably copper. Conductor 140 is routed through primary channel 138 and into coil groove 136. Conductor 140 is further configured in coil groove 136 to form an electrical coil 142. Electrical coil 142 is disposed in coil groove 136.

A nonmagnetic material 144 is configured to fill primary channel 138 and hole 132 at second end 126. Nonmagnetic material 144 effectively seals electrical conductor 140 and electrical coil 142 therein. Nonmagnetic material 144 is insulative and also an electrically-nonconducting material so as to prevent the coil and conductor from electrically conducting with the piston body. Nonmagnetic material 144 also prevents conductor 140 and coil 142 to contact MR fluid 116 when assembly 112 is disposed in cylinder 114. Thus, undesired electrical shorts are prevented in MR damper 110. Nonmagnetic material 144 may be made of an overmold material. The overmold material is typically formed from a polymeric material.

An annular flux ring structure 120 generally surrounds body 118 about axis A'. Plates 128, 130 may be fastened and held in place about piston body 118 by crimping annular structure 120 over plates 128, 130. Annular structure 120 defines a substantially magnetically energizable MR-fluid passageway 122 having a parallel, annular spaced relationship about axis A'. The term "passageway" means a through passageway. The substantially magnetically energizable MR-fluid passageway is typically a cylindrical passageway have a cross-sectional area of a circle. The substantially magnetically energizable MR-fluid passageway may be formed of a linear or a nonlinear shape. Substantially magnetically energizable MR-fluid passageway 122 has a length and MR fluid 116 flows through the length through primary channel MR piston assembly 112 in cylinder 114 during MR damper operation. The annular diameter of the substantially magnetically energizable MR-fluid passageway is typically 25 to 40 millimeters. The length of the substantially magnetically energizable MR-fluid passageway 122 also includes the openings in first and second end plates 128, 130. The MR fluid properties associated with MR fluid 116 are electrically controlled in substantially magnetically energizable MR-fluid passageway 122 during MR damper operation. Alternately, the substantially magnetically energizable MR-fluid passageway is a substantially annularly cylindrical passageway having a flow cross-sectional shape of segments of a substantially circular ring. The flow cross-sectional area of the substantially magnetically energizable MR-fluid passageway 122 is substantially constant along the passageway length.

A coaxial rod 146 defines a coaxial opening 148 therethrough. Rod 146 is attached to first end plate 128. Rod 146 is attached to piston body 118 by a press-fitting into body 118 and is retained by a steel retention ring 135 and first end plate 128 that is held in place by crimped flux ring structure 120. The other end of rod 146 remote from first end plate 128 is generally attached to a structure outside of the MR damper. Opening 148 in rod 146 generally aligns with hole 132 in body 118 at first end 124. Opening 148 includes electrical conductor means 150 in electrical connection with electrical conductor 140. Electrical current to supply electrical conductor means 140 may be provided and controlled externally to dynamically regulate the damping forces in the MR damper. For example, an external power source or controller may be suitable to provide the variable electrical current.

As shown in FIG. 3, a substantially magnetically non-energizeable MR fluid passageway 152 allows MR fluid 116 in cylinder 114 to pass freely through body 118 and end plates 128, 130 during MR damper operation. Substantially magnetically non-energizeable MR fluid passageway 152 is defined by piston body 118 and first and second plate 128, 130 therethrough. First substantially magnetically non-energizable MR-fluid passageway 152 is disposed outbound from hole 132 and is in an axial, radially-spaced relationship to axis A'. The substantially magnetically non-energizeable MR fluid passageway is typically linear and allows MR fluid to freely flow through the piston body during MR damper operation. The substantially magnetically non-energizeable MR fluid passageway are substantially not affected by the applied magnetic field.

Substantially magnetically non-energizeable MR fluid passageway 152 is also known in the art as a nonmagnetic hydraulic by-pass hole, or even more simply, as a by-pass hole. It is understood to one of ordinary skill in the art, that use of the by-pass hole is dependent on the force performance required in a particular MR damper application. Furthermore, the particular flow cross-sectional area of the magnetically non-energizable passageway is chosen for a particular damper application. The radius of the centerline of the substantially magnetically non-energizable MR-fluid passageway is typically a radius of 8 to 11 millimeters, with the size being dependent on application of use. The size of the substantially magnetically non-energizable MR-fluid passageway is dependent on the application for the MR damper.

Figure 6:
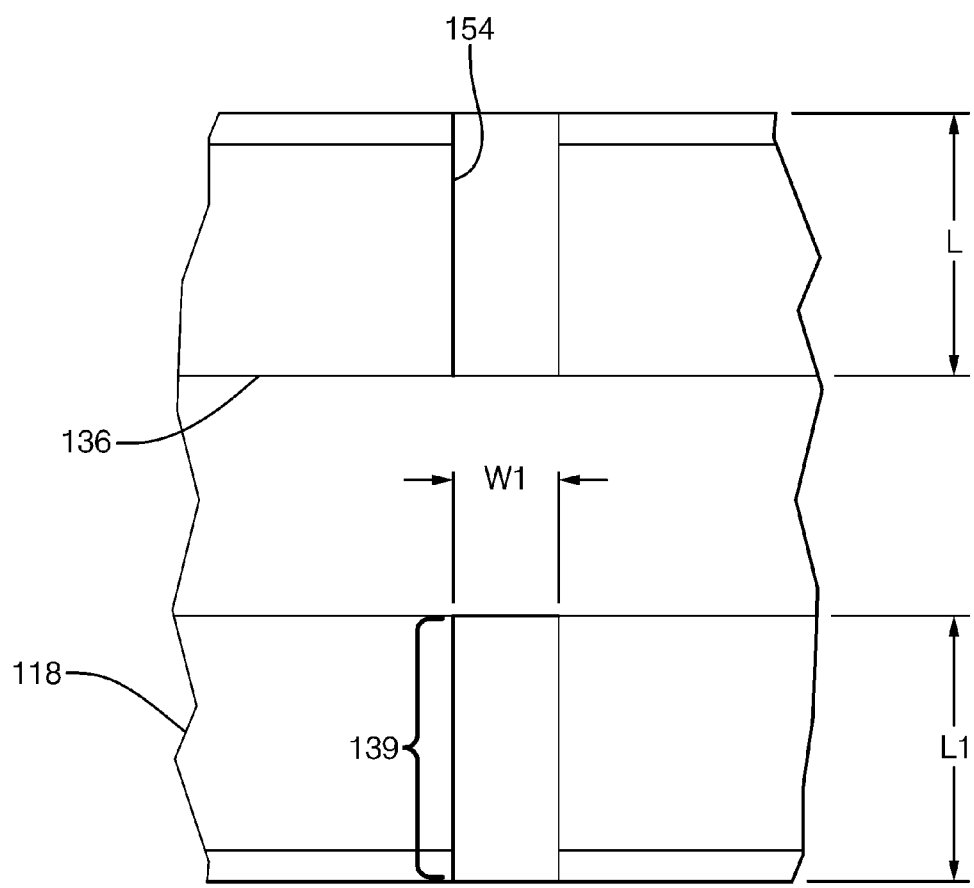
FIG. 6 is a magnified view showing the primary and the secondary channels in the piston body of FIG. 3.
Figure 7:
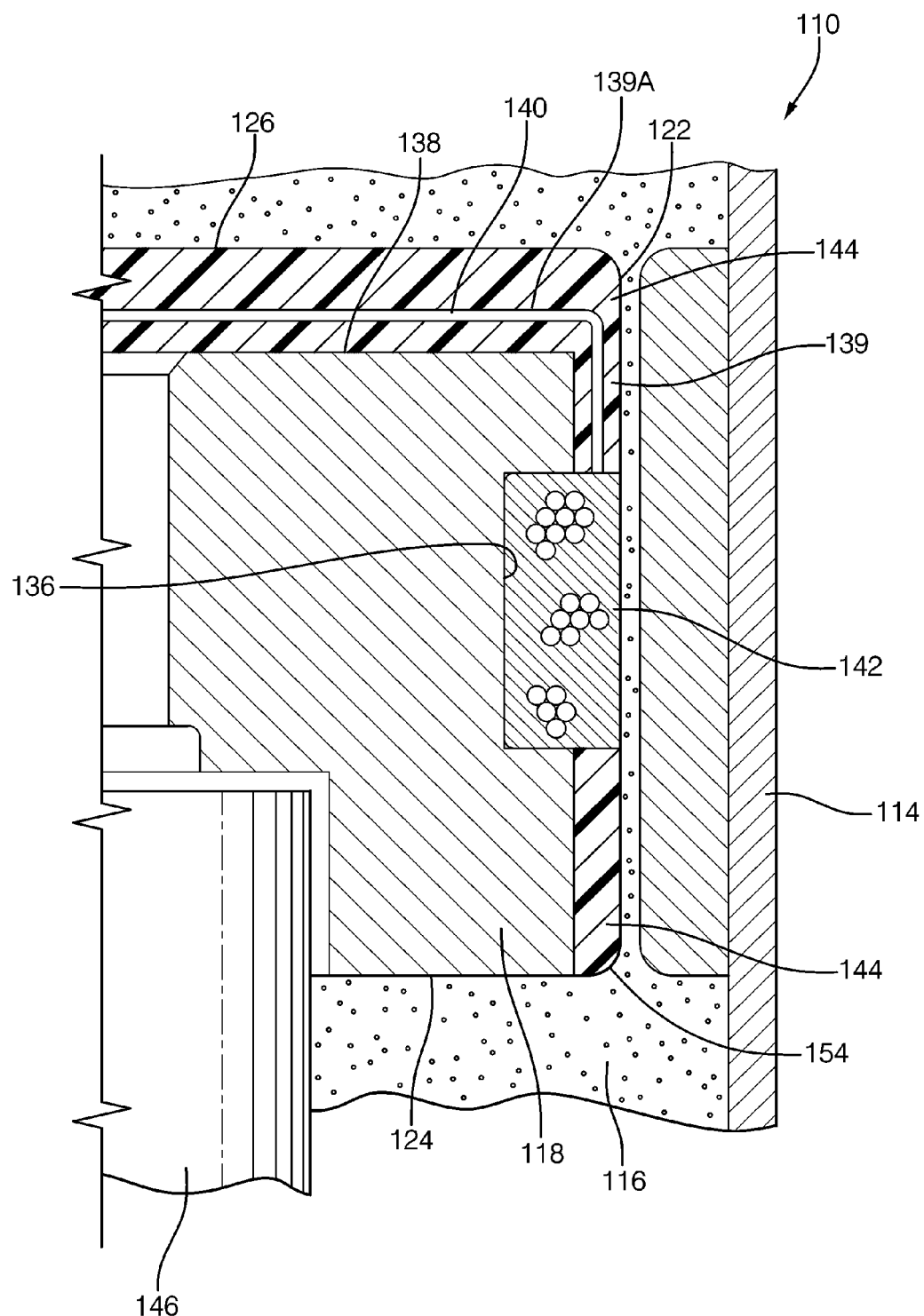
FIG. 7 is a magnified view of the substantially magnetically energizable MR-fluid passageway of the primary channel MR piston assembly of FIG. 4, showing details thereof.

Secondary channel 154 is defined in outer body surface 134 extending from coil groove 136 toward first end 124. Secondary channel 154 is filled with nonmagnetic material 144. Material 114 prevents MR fluid 116 from flowing in secondary channel 154. The nonmagnetic material is needed in the secondary channel to maintain the cross-sectional area of the substantially magnetically energizable MR-fluid passageway and to reduce flux density above the secondary channel to levels similar to that of the primary channel. Thus, the combination of the primary and secondary channel act in a fashion similar to that of a nonmagnetic by-pass hole. Referring to FIGS. 6-7, secondary channel 154 has a length L, a width W, and a depth D. As shown in FIG. 6, length L on secondary channel 154 extends from coil groove 136 to first end 124. It is to be understood that length L of the secondary channel may be any suitable length dependent on performance requirements needed for the MR damper. Length L, extending from coil groove 136 to first end 124, is generally greater than width W and depth D.

First primary channel portion 139 has a length L1, a width W1, and a depth D1 (not shown). Similar to the first primary channel portion 139, second primary portion has a length L2, a width W2, and a depth D2. Width W1 and depth D1 of first primary channel portion 139 about equals width W and depth D of secondary channel 154 that also equals width W2 and depth D2 of second primary channel portion 139A. A uniform depth and width in the primary and secondary channels allows for straight, uniform MR fluid flow to enter/exit the substantially magnetically energizable MR-fluid passageway during MR damper operation. Typical width of the primary and secondary channel are between 2 to 6 millimeters. The depth D of the secondary channel is typically from about 1 to 4 millimeters. It is to be understood that the invention is not limited to the first primary channel portion and the secondary channel and the second primary channel portion having a uniform width and uniform depth that are about equal. For example, the secondary channel may have an increased width and depth over the corresponding width and depth of the first primary channel portion. Different widths and depths used in the different channels may provide different by-pass force characteristics. Referring to FIG. 6, first primary channel portion 139 and secondary channel 154 are formed having a cross-sectional shape being semi-rectangular. Alternately, the first primary channel portion and the secondary channel and the second primary channel portion may be formed of other shapes such as semi-circular, semi-triangular, semi-trapezoidal, and the like. A further alternate embodiment may include the secondary channel having a different shape from the first primary channel portion. Changing the shape of the channels may provide different force characteristics to better tune the piston assembly to a particular application.

Referring to FIG. 3, primary channel portion 139 and secondary channel 154 are axially aligned with axis A'. Additionally, primary channel portion 139 is also in axial alignment to secondary channel 154 separated by coil groove 136. Alternately, the primary channel portion and the secondary channel may be axially aligned, but the secondary channel does not extend completely to the first end. Referring to FIGS. 3 and 6, width W1 of first primary channel portion 139 is in general axial alignment with width W of secondary channel 139A. Width W1 of first primary portion 129 is generally not offset from width W of secondary channel 154.

When not in operation, assembly 112 is at rest in cylinder 114 of MR damper 110. Electrical conductor means 150, electrical conductor 140, and electrical coil 142 are not energized and no magnetic field is produced across MR fluid 116 in substantially magnetically energizable MR-fluid passageway 122. With no magnetic field produced across substantially magnetically energizable MR-fluid passageway 122, the metallic particles remain randomly suspended in MR fluid 116. When not in operation, MR fluid 116 has the characteristic behavior of a liquid.

When in operation, assembly 112 moves in a reciprocal motion in cylinder 114 at a varying speed and the force acting on assembly 112 is dependent on an applied varying magnetic field across MR fluid 116 in substantially magnetically energizable MR-fluid passageway 122. The magnitude of the magnetic field is dependent on the amount of applied current applied to electrical coil 142 supplied through electrical conductor means 150 via electrical conductor 140. MR fluid 116 may be diverted into by-pass hole 152 which is substantially free of magnetic field effects. Therefore, primary channel MR piston assembly 112 may generate minimal damping forces at lower primary channel MR piston assembly operating velocities. In a vehicle suspension system, for example, this provides "smooth" vehicle ride characteristics desired by a vehicle occupant.

Figure 8:
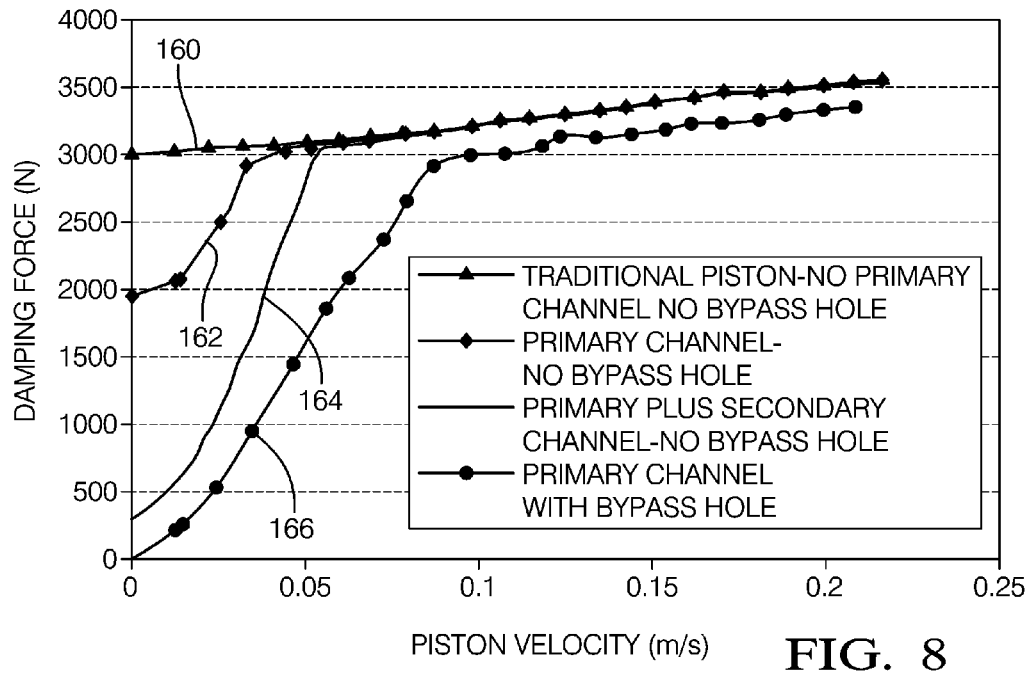
FIG. 8 is a graph of math model data of damping force-verses-primary channel MR piston assembly velocity curves for various piston assemblies.

The performance of the primary channel MR damper in operation is understood by examination of a damper force-versus-primary channel MR piston assembly velocity curve of the MR damper. Referring to FIG. 8, a plurality of damping force-verses-MR piston assembly velocity curves 160, 162, 164, 166 are illustrated. Curves 160, 162 represent the idealized operating performance of prior art MR piston assemblies with no primary channel and no hydraulic by-pass hole and a primary channel without a by-pass hole, respectively. Performance curves 164, 166 represent the idealized operating performance of a MR damper with primary and secondary channel and no by-pass hole and primary channel with a by-pass hole, respectively.

The idealized performance curve 160 of the primary channel MR piston assembly has neither a nonmagnetic hydraulic by-pass hole nor a primary wire slot channel as compared to curve 162 that includes a primary wire slot channel. Curve 160 has a y-intercept point at about y=3,000 Newtons. The y-intercept point on curve 160 is subsequently followed by a generally single, low value, positively-sloped incline ramp, or force shelf, through the low, mid, and high primary channel MR piston assembly velocities. Curve 162, that includes a primary wire slot channel, has a y-intercept point at about y=1,975 Newtons. The y-intercept point on curve 162 is subsequently followed by a generally positive, incline ramp into a knee-point at about x=0.035 meters/second. The knee-point of curve 162 transitions into the generally single, low-value, positively-sloped force shelf shown in curve 160 after the knee-point at about x=0.035 meters/second and on through the mid-to-high primary channel MR piston assembly velocities. The high y-intercept forces shown in the idealized performance curves 160 and 162 result in undesirable ride harshness when the damper velocity passes through zero. A hydraulic by-pass hole is normally utilized to reduce this intercept.

Curve 164 has a y-intercept point at about y=300 Newtons. The y-intercept point on curve 164 is subsequently followed by a generally positive, single-sloped incline ramp into a knee-point at about x=0.05 meters/second. The addition of the secondary channel in 164 significantly reduces the intercept force versus the primary channel alone, curve 162. The knee-point of curve 164 transitions into the generally single, low value, positively-sloped force shelf after the knee-point at about x=0.05 as similarly depicted in curves 160, 162 through the mid-to-high primary channel MR piston assembly velocities. The primary channel MR piston assembly of curve 166 includes a single nonmagnetic hydraulic by-pass hole, and has a y-intercept point at about y=75 Newtons. The y-intercept point on curve 166 is subsequently followed by a generally positive, single-sloped incline ramp into a knee-point at x=0.08 meters/second. The knee-point of curve 166 transitions into the generally single, low value, positively-sloped force shelf that is generally about 200 Newtons less than the force shelf shown in curve 160 after the knee-point at about x=0.8 meters/second through the mid-to-high primary channel MR piston assembly velocities.

In a vehicle suspension system that contains a MR damper that includes the primary channel MR piston assembly including the secondary channel, a lower y-intercept point and positive, single-slope incline ramp over an increased low velocity range of the primary channel MR piston assembly including the secondary channel combine to produce improved vehicle performance. While the secondary channel as shown in FIG. 3 extends from the circumferential coil groove to the first end, the length of the secondary channel is in relationship with the y-intercept point on the damper force-verses-primary channel MR piston assembly velocity base curve associated with the primary channel MR piston assembly. As the length of the secondary channel increases in length toward the first end the y-intercept point on the damper force-versus-primary channel MR piston assembly base curve correspondingly decreases. Decreasing the y-intercept point toward the origin of the damper force-versus-primary channel MR piston assembly base curve provides for a more "smooth" ride when the MR damper is employed in a vehicle suspension system.

Figure 9:
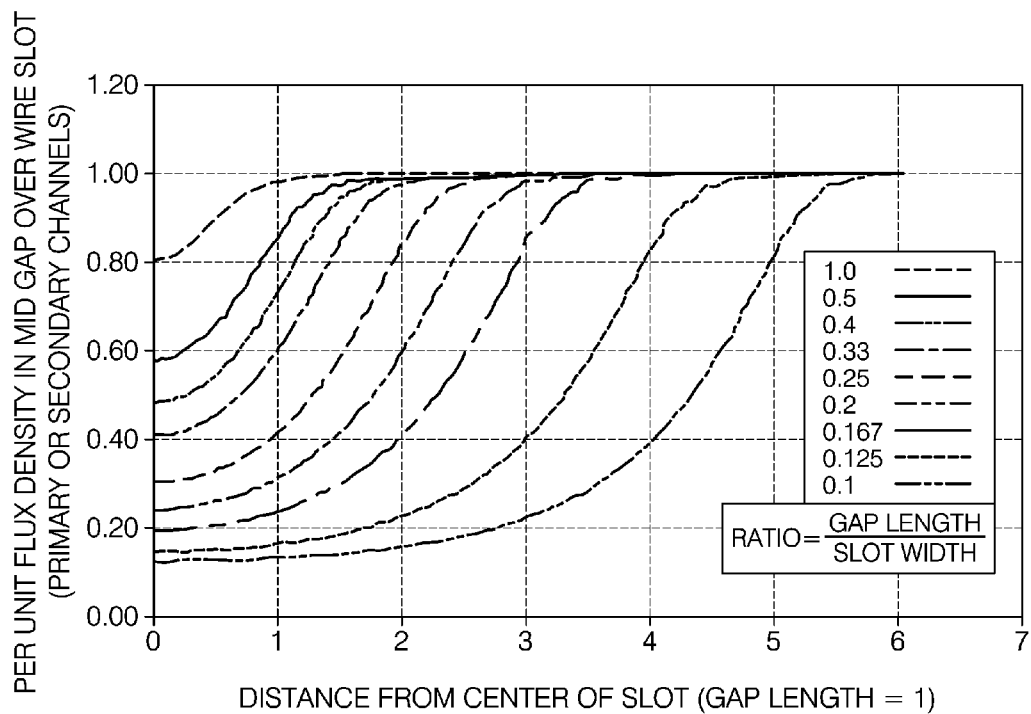
FIG. 9 is a graph showing the relationship between the per unit flux density in mid gap of the magnetizable MR-fluid passageway versus distance from the center of the primary and secondary channel for the various channel widths according to the present invention.

The damper force-versus-primary channel MR piston velocity curves in FIG. 8 for a primary channel MR piston assembly including the secondary channel may be optimized dependent on the application of use. For example, increasing width W of secondary channel 154 relative to a width of the substantially magnetically energizable MR-fluid passageway 122 produces a damper force-versus-primary channel MR piston assembly velocity curve that produces a knee-point located at an increased primary channel MR piston assembly velocity on an operational curve versus the associated knee-point on the base damper force-versus-primary channel MR piston velocity curve. Referring to FIG. 9, shows the impact of the ratio of the gap length to the channel width, for values of this ratio from 0.1 to 1.0, on the flux density in the middle of the fluid gap directly above a primary or secondary channel. Zero (0) distance refers to the centerline of the channel (slot) and the flux density there is minimum. A distance of one (1) is equal to the per unitized radial length of the magnetizable MR-fluid gap. The flux density increases as the edge of the channel is reached and approaches the nominal gap flux density of 1 per unit away from the outer edge of the channel. It is clear from this figure that the level of flux density in the gap above the channel is controlled by the width of the slot in relation to the gap length, the lower the gap/slot ratio, the lower the flux density. By-pass behavior is enhanced by lowering the flux density at the slot centerline as much as possible.

Figure 10:
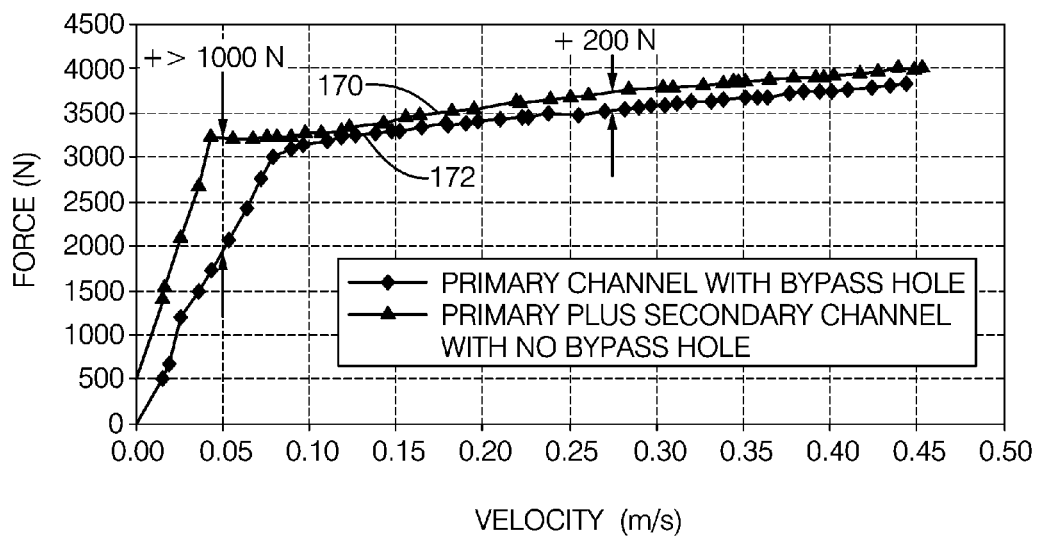
FIG. 10 is a graph showing the measured damping force-verses-piston velocity for a primary channel MR piston with bypass hole and a primary channel MR piston with secondary channel and no bypass hole.

Referring to FIG. 10, a graph of measured damper force-verses-primary channel MR piston assembly velocity curves 170, 172 of a primary channel MR damper including a secondary channel is shown. Curves 170, 172 include the annular substantially magnetically energizable MR-fluid passageway thereon including tapered ends at the first and second end plates which are the entry/exit points for the MR fluid into the primary channel MR piston assembly. Primary channel MR piston assembly 112 including secondary channel 154 with no nonmagnetic hydraulic by-pass hole is depicted by curve 170. The y-intercept point of curve 170 is about x=500 Newtons. A generally positive, single-slope ramp succeeds the y-intercept point into a knee-point at about x=0.4 meters/second. The zero velocity intercept at about x=500 Newtons transitions into a generally single, low value, positively-sloped force shelf after the knee-point at about x=0.04 meters/second and on through the mid-to-high primary channel MR piston assembly velocities. In comparison, curve is the primary channel piston with a single by-pass hole. The y-intercept point of curve 172 is at about x=100 Newtons subsequently followed by a two-step ramp yielding to a knee-point at x=0.07 meters/second and transitioning into a generally single, low value, positively-sloped force shelf after the knee-point at about x=0.07 and on through the mid-to-high primary channel MR piston assembly velocities. The force shelf for curve 172 is generally less than the force shelf for curve 170 by about 200 Newtons at about x=0.27 meters/second. Overall the use of a secondary channel allows one to eliminate the hydraulic by-pass hole which provides the advantage of significant force improvement at low velocities (+1000 N) plus additional force improvements (+200) at higher velocities as well as eliminating the two-slope force-velocity characteristic below the kneepoint. A negative is that the zero velocity intercept of this arrangement is slightly higher than the bypass hole; this can be remedied through the addition of a very small hydraulic MR-fluid bypass hole or by widening the primary and secondary channels as suggested in FIG. 9.

Figure 11:
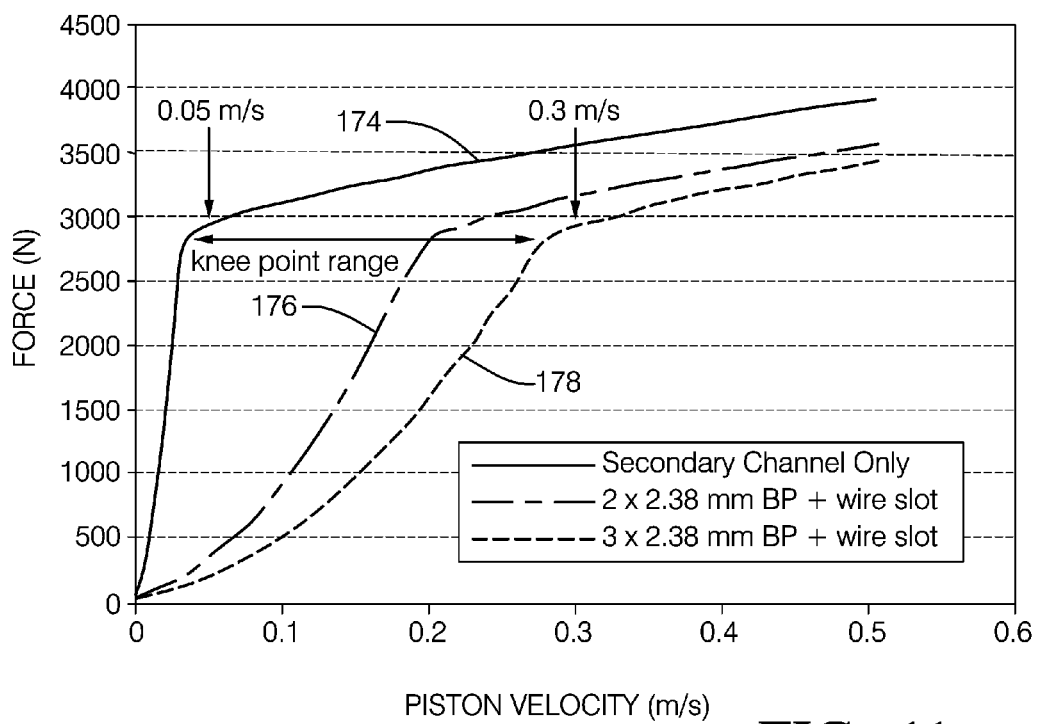
FIG. 11 is a graph showing the damping force-verses-primary channel piston assembly velocity curves of the primary channel MR piston assembly including the secondary channel of FIG. 4 versus the number of substantially non-magnetically energizable MR-fluid passageways disposed in the primary channel piston assembly.

The damper force-versus-primary channel MR piston velocity curve for a primary channel MR piston assembly including the secondary channel may be yet further optimized dependent the number of by-pass holes disposed in the primary channel MR piston assembly. Referring to FIG. 11, math-modeled curves 174, 176, and 178 show a primary channel MR piston assembly with no by-pass hole, with two by-pass holes, and with three by-pass holes, respectively. As depicted in FIG. 11, increasing the number of by-pass holes increases the low end velocity response by distributing the location of knee-points on damper force-versus-primary channel MR piston assembly curves at increased primary channel MR piston assembly velocities on the x-axis. Thus, new damper force-versus-primary channel MR piston velocity curves 172 and 174 and their corresponding knee-points are increasing located to the right of the base damper force-versus-primary channel MR piston velocity curve 170 that does not include a by-pass hole. It may be understood by those in the art that a knee-point range of curves is established dependent on the number of by-pass holes contained in the primary channel MR piston assembly. Establishing the necessary amount of by-pass holes is dependent on the performance characteristics needed in the MR damper application.

Figure 12:
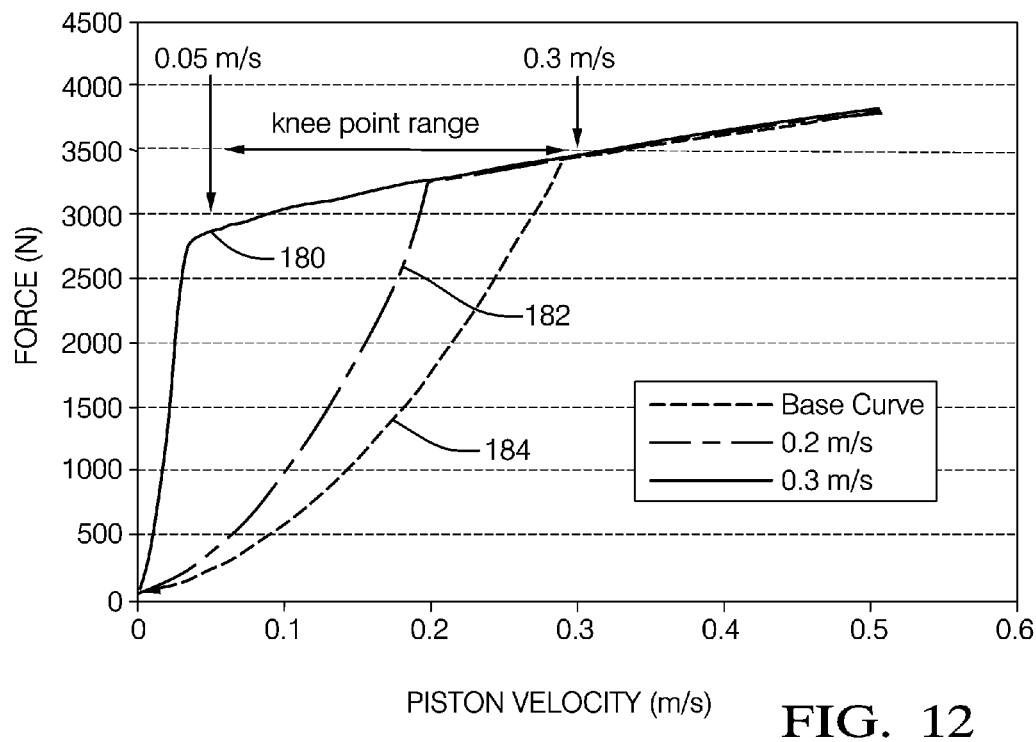
FIG. 12 is a graph displaying the damping force-verses-primary channel piston assembly velocity curve of the primary channel piston assembly of FIG. 4 and a plurality of other damping force-verses-primary channel piston assembly velocity curves that are electronically realized by a controller according to an alternate embodiment of the present invention.

Referring to FIG. 12, a further alternate embodiment of the invention includes using a controller (not shown) being in electrical connection with the primary plus secondary channel MR piston assembly (not shown) of the MR damper (not shown). A look-table includes values (not shown). The values are accessed by the controller to operatively electronically control the primary channel MR piston assembly of the MR damper over a knee-point operating range of the primary channel MR piston assembly of the MR damper. For dynamic electronic control of the force-versus-primary channel MR piston assembly velocity curves, no actual by-pass holes or a very small by-pass hole must be configured in the primary channel MR piston assembly. If a small by-pass hole is required to achieve a lower y-intercept point, the small by-pass hole may have a size of about less than 1.0 millimeter. The primary plus secondary channel MR piston assembly includes an initial damper force-versus-primary channel MR piston assembly velocity curve 180 having an initial y-intercept point at about y=150 Newtons and an initial knee-point is disposed at about x=0.03 meters/second. The data values represent characterization of at least one of a plurality of predetermined characterized damper force-versus-primary channel MR piston assembly velocity curves 182, 184. The at least one of the plurality of predetermined characterized damper force-versus-primary channel MR piston assembly velocity curves 182, 184 represent at least one of a plurality of damper force-versus-primary channel MR piston assembly velocity curves associated with at least one of a plurality of substantially magnetically non-energizable MR-fluid passageways being defined in the primary channel MR piston assembly as shown in the embodiment of FIG. 11. The at least one of the plurality of damper force-versus-primary channel MR piston assembly velocity curves include at least one of a plurality of y-intercept points and at least one of a plurality of knee-points. The plurality of knee-points are disposed at a plurality of primary channel MR piston assembly velocities. The at least one of the plurality of y-intercept points are less than the initial y-intercept point of y=150 Newtons. The at least one of the plurality of primary channel MR piston assembly velocities (about x=0.2 meters/second and about x=0.3 meters/second) being greater than the initial primary channel MR piston assembly velocity of about x=0.03 meters/second. The knee-point operating range includes the initial damper force-versus-primary channel MR piston assembly velocity curve 180 and the said at least one of the plurality of predetermined characterized damper force-versus-primary channel MR piston assembly velocity curves 184, 182. The controller is configured to electronically select at least one of not selecting the at least one of the plurality of predetermined characterized damper force-versus-primary channel MR piston assembly velocity curves such that the initial damper force-versus-primary channel MR piston assembly velocity curve defines the operation of the primary channel MR piston assembly of the MR damper, and the at least one of the at least one of the plurality of predetermined characterized damper force-versus-primary channel MR piston assembly velocity curves such that the at least one of the at least one of the plurality of predetermined characterized damper force-versus-primary channel MR piston assembly velocity curves defines the operation of the primary channel MR piston assembly of the MR damper. The curve selection by the controller occurs during operation of the primary channel MR piston assembly of the MR damper to optimize performance of the primary channel MR piston assembly of the MR damper at low primary channel MR piston assembly velocities. With the embodiment of FIG. 12, the knee-point range, introduced in the embodiment of FIG. 11, may be accessed without the need for supplying the multiple by-pass holes in the piston body. A single, small by-pass hole may be combined with the primary and secondary channels to control and reduce the y-intercept point, or force intercept at zero velocity (meter/second). Thus, electronically controlling the damper force-versus-primary channel MR piston velocity curves over the knee-point range in real time dramatically increases the operational range of the MR damper that includes the primary channel MR piston assembly including the secondary channel at low primary channel MR piston velocities. Additionally, degradation in the force shelf is not evident in the mid-to-high frequencies as compared with implementation of a primary channel MR piston assembly using actual by-pass holes. This is due to the fact that the limits of the damper performance are set by the base curve 180. Degradation in the force shelf is not seen due to the absence of actual by-pass hole in the primary channel MR piston assembly. The look-up table may be internal to the controller. Alternately, the look-up table may be accessed from a remote location remote from the controller.

A further alternate embodiment of the invention includes the secondary channel comprising a first length from the coil groove towards the first end and a second length from the coil groove towards the first end. The second length is greater than the first length. The first length includes a first damper force-versus-primary channel MR piston assembly velocity curve having a first y-intercept point and a first knee-point. The first knee-point is disposed at a first primary channel MR piston velocity. The second length includes a second damper force-versus-primary channel MR piston assembly velocity curve having a second y-intercept point and a second knee-point. The second knee-point is disposed at a second primary channel MR piston assembly velocity. The second y-intercept point is less than the first y-intercept point. The second primary channel MR piston assembly velocity is greater than the first primary MR piston assembly velocity such that the second knee-point is located to the right of the first knee-point on a damper force-versus-primary channel MR piston assembly graph depicting the first and second damper force-versus-primary channel MR piston assembly velocity curves.

Figure 13:
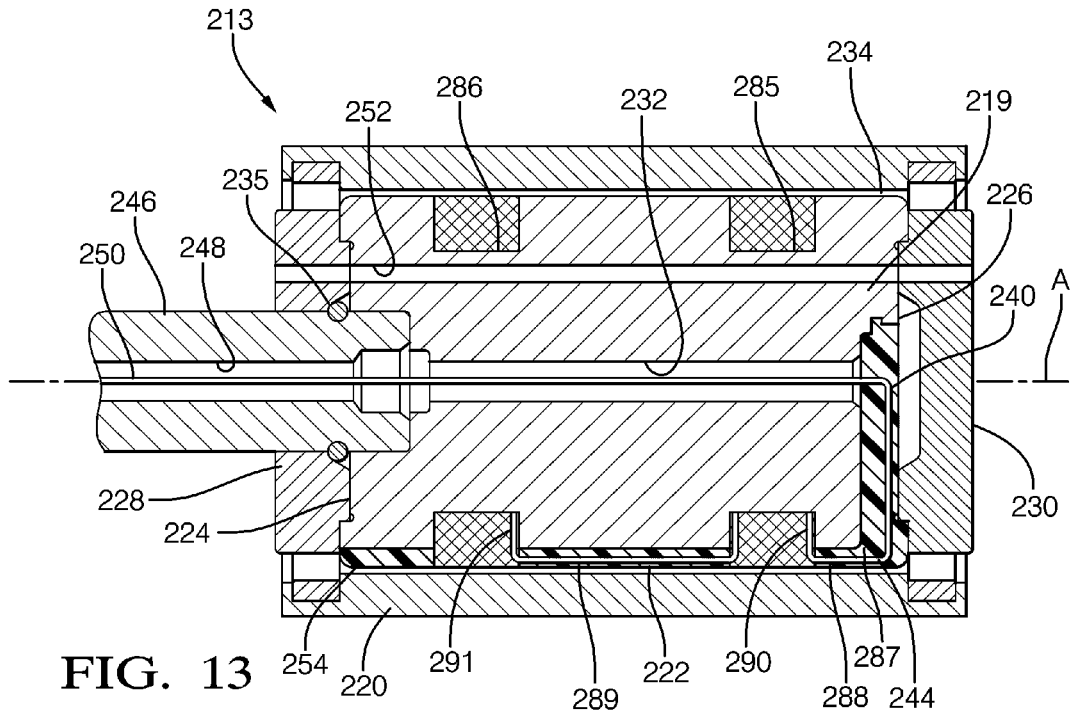
FIG. 13 is a longitudinal cross-section view of a multi-primary channel MR piston assembly including a secondary channel and details thereof according to an alternate embodiment of the present invention.

In the embodiment of FIGS. 3-12, the primary piston assembly is formed with a piston body that includes a primary and a single secondary channel. An alternate second embodiment includes configuration of a piston body including multiple primary channels and a secondary channel, or a dual coil piston assembly. Referring to FIG. 13, where like elements with the embodiment of FIGS. 3-12 differ by 100, a MR damper (not shown) includes a dual coil piston assembly with two primary channels for wire routing 213. Hereafter, the dual coil piston assembly with two primary channels for wire routing will be referred to as a "multi-primary channel MR piston assembly." Multi-primary channel MR piston assembly 213 has a longitudinal axis A". Assembly 213 is disposed in a cylinder (not shown) contained with MR fluid (not shown) therein. Assembly 213 is coaxially disposed in the cylinder and adapted for being slidably engaging in the cylinder for axial reciprocal movement therein. Multi-primary channel MR piston assembly 213 includes a piston body 219 defining a coaxial hole 232 therethrough. Piston body 219 includes an outer body surface 234. Piston body 219 further includes a first end 224 and a second end 226 axially remote from first end 224. First and second end 224, 226 are generally perpendicular to axis A". A first end plate 228 is attached to first end 224 and a second end plate 230 is attached to second end 226. A first circumferential coil groove 285 is defined in outer body surface 234 about axis A". A second circumferential coil groove 286 is defined in outer body surface 234 about axis A". Second coil groove 286 is defined in outer body surface 234 surrounding axis A" proximate to first end 224 relative to first coil groove 285. Second coil groove 286 does not overlap first coil groove 285. A first primary channel 287 defined in outer body surface 234 extends from hole 232 at second end 226 to first coil groove 285. First primary channel 287 includes a first primary channel portion 288 disposed from second end 226 to first coil groove 285. A second primary channel 289 is defined in outer body surface 234 extending from first coil groove 285 to second coil groove 286. An electrical conductor 240 is disposed in hole 232 and first primary channel 287 and first coil groove 285 and second primary channel 289 and second coil groove 286. Electrical conductor 240 is further configured to form a first electrical coil 290 disposed in first coil groove 285 and a second electrical coil 291 disposed in second coil groove 286. A nonmagnetic material 244 is configured to fill first and second coil groove 285, 286, first and second primary channel 287, 289, and hole 232 at second end 230 to effectively seal electrical conductor 240 and first and second electrical coil 290, 291 therein. A secondary channel 254 is defined in outer body surface 234 extending from second coil groove 286 toward first end 224. Secondary channel 254 is filled with nonmagnetic material 244. An annular structure 220 generally surrounds piston body 219 about axis A". Annular structure 220 is attached to piston body 219 and defines a substantially magnetically energizable MR-fluid passageway 222 having a parallel, annular spaced relationship about the axis A". A coaxial rod 246 defines a coaxial opening 248 therethrough. Rod 246 is attached at first end plate 228 via retention ring 235. Opening 248 in rod 246 generally aligns with hole 232 in piston body 219 and includes electrical conductor means 250 in electrical connection with electrical conductor 240. Piston body 219 and first and second end plate 228, 230 further define a substantially magnetically non-energizable MR-fluid passageway 252 therethrough. Substantially magnetically non-energizable MR-fluid passageway 252 is disposed outbound from hole 232 and is in an axial, radially spaced relationship to axis A". Piston body 219, structure 220, and assembly 213 have about the same diameter width as the similar corresponding structure in the embodiment of FIGS. 3-12, but each structure has a greater axial length than the embodiment in FIGS. 3-12. First primary channel portion 288, second primary channel 289, and secondary channel 254 are axially aligned. First primary channel portion 288 is in alignment with second primary channel 289. First primary channel portion 288 and second primary channel 289 are in further alignment with to secondary channel 254. Secondary channel 254 comprises a length L, and length L extends from second coil groove 286 to first end 224. The described herein, constructions, designs and variations of the first embodiment of assembly 113 are equally applicable to the second embodiment of assembly 213.

As in the embodiment of FIGS. 3-12, assembly 213 may similarly be in electrical connection with a controller. The controller accesses a look-up table that contains values that represent a plurality of damper force-versus-primary channel MR piston assembly velocity performance curves having distinct knee points in a knee point operational range of the MR damper as previously described herein. Dual coil pistons with the multi-primary channel MR piston assembly are generally used when the length of piston body is greater that the diameter of the piston body.

Figure 4:
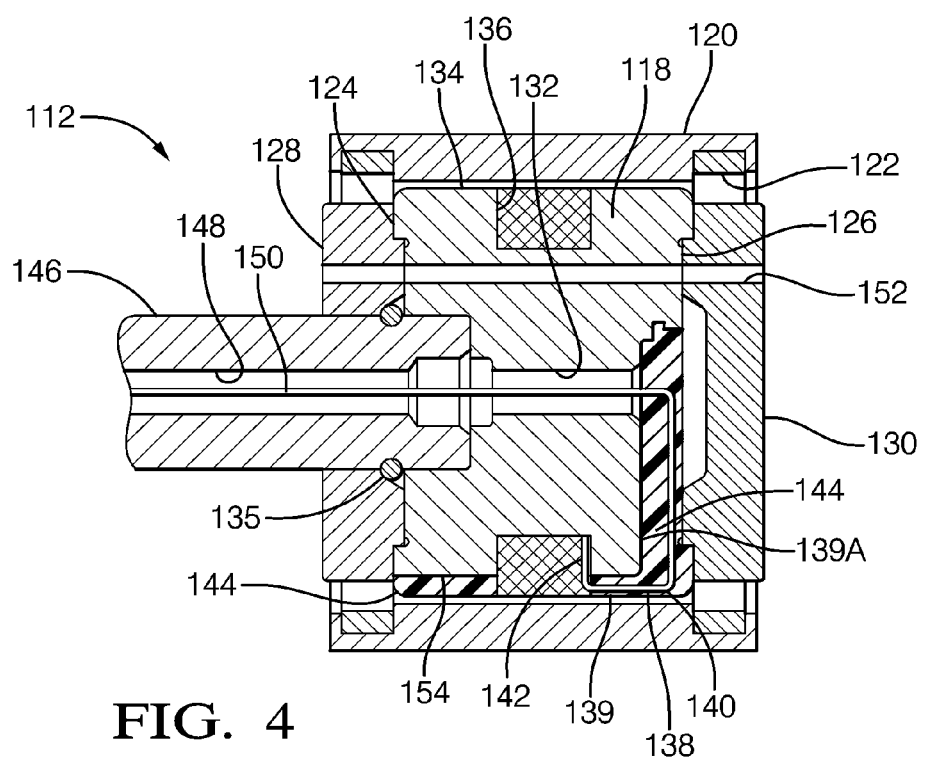
FIG. 4 is a longitudinal cross-section view of a MR damper piston and rod assembly including the primary channel MR piston assembly that includes the piston body of FIG. 3, showing details thereof.
Figure 5:
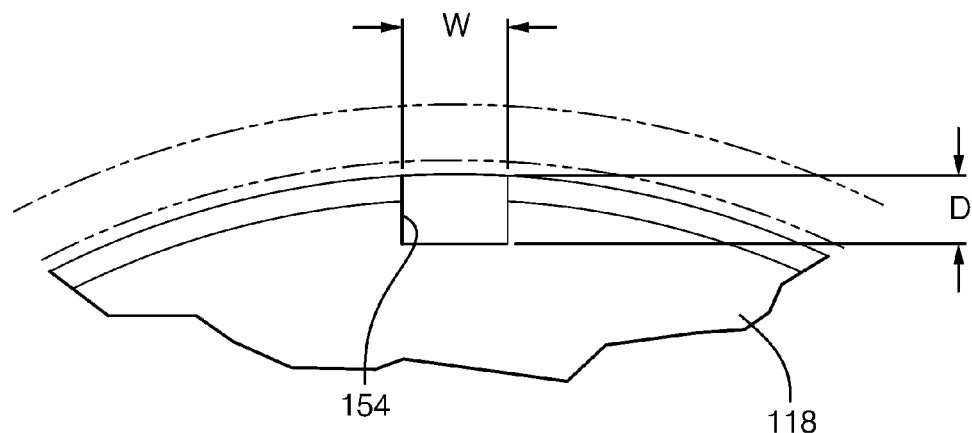
FIG. 5 is a cross-section view of the secondary channel of the piston body of FIG. 3, showing details thereof.

As depicted in FIGS. 4 and 13, electrical connection means is a copper wire 150, 250 that is fed through rod 146, 246 into hole 132, 232 to connect with electrical conductor 140, 240. Alternately, the rod may have electrical connection means that includes an electrode (not shown) connected to a connector (not shown) that is protected by a seal and the connector connects to the electrical connector in the piston body.

In a further alternate embodiment, the force performance of a primary channel MR piston assembly including the secondary channel may be further optimized by increasing the cross-sectional diameter of the by-pass hole. Increasing the cross-sectional diameter of the by-pass hole may produce a new damper force-versus-velocity curve having a lower y-intercept point and a knee-point at an increased primary channel MR piston assembly velocity verses the y-intercept point and knee-point associated with the original by-pass hole.

In a further alternate embodiment, the force performance of a primary channel MR piston assembly including the secondary channel may be further optimized by providing a width of the primary channel and a width the secondary channel. The widths of the width the secondary channel is about equal to the width of the primary channel. The widths of the primary and secondary channel are relative to a radial gap length of a substantially magnetically energizable MR-fluid passageway such that increasing the primary and secondary channel widths relative to the length of the substantially magnetically energizable MR-fluid passageway establishes a new damper force-versus-primary channel MR assembly performance curve. The new primary channel MR assembly performance curve includes a second y-intercept point and a second knee-point in the performance operating range of the MR damper. The second knee-point is positioned at a second primary channel MR piston velocity. The second primary channel MR piston velocity is greater than the first primary channel MR piston velocity on a base damper force versus MR piston assembly velocity curve. The second y-intercept point is less than the first y-intercept point a base damper force versus MR piston assembly velocity curve.

Figure 14:
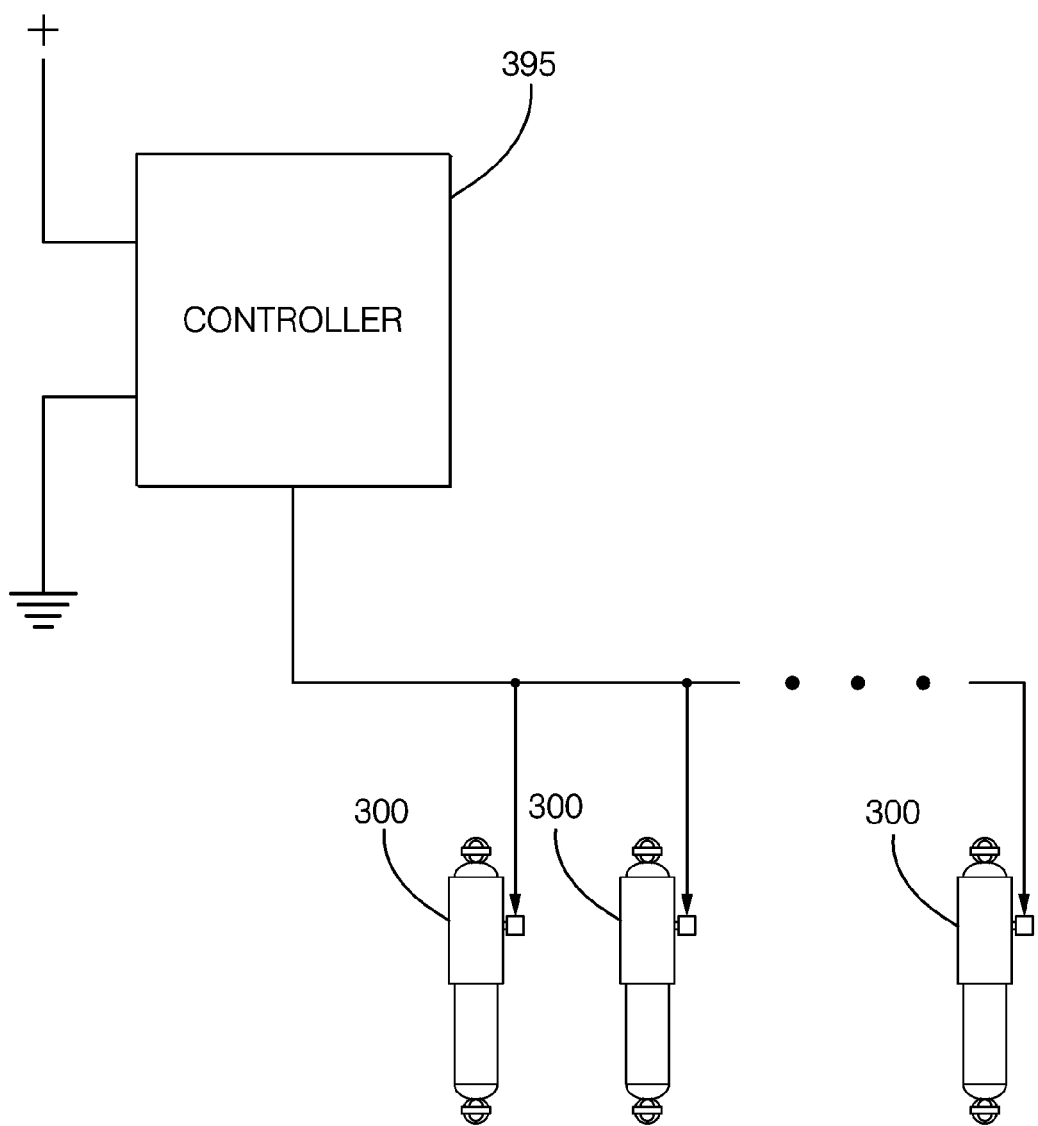
FIG. 14 shows a MR damping system including the MR damper of FIG. 4 according to an alternate embodiment of the invention.

Referring to FIG. 14, a further alternate embodiment of the present invention includes a controller 395 in electrical connection with at least one primary MR damper 300 that includes the secondary channel as described previously herein. This circuit topology configuration may find application in an exercise equipment apparatus such as a rowing machine or stair climber that use shock absorbers to provide motion resistance. The number of MR dampers needed in the application is dependent on the requirements of the apparatus. A further alternate embodiment is to use MR damper 300 to provide motion isolation for a building, bridge, or other structure subject to earthquakes. In yet a further alternate embodiment, MR damper 300 may be useful in vehicles or structures in outer space applications having vibration damping requirements. Other applications are left to the artesian.

Figure 15:
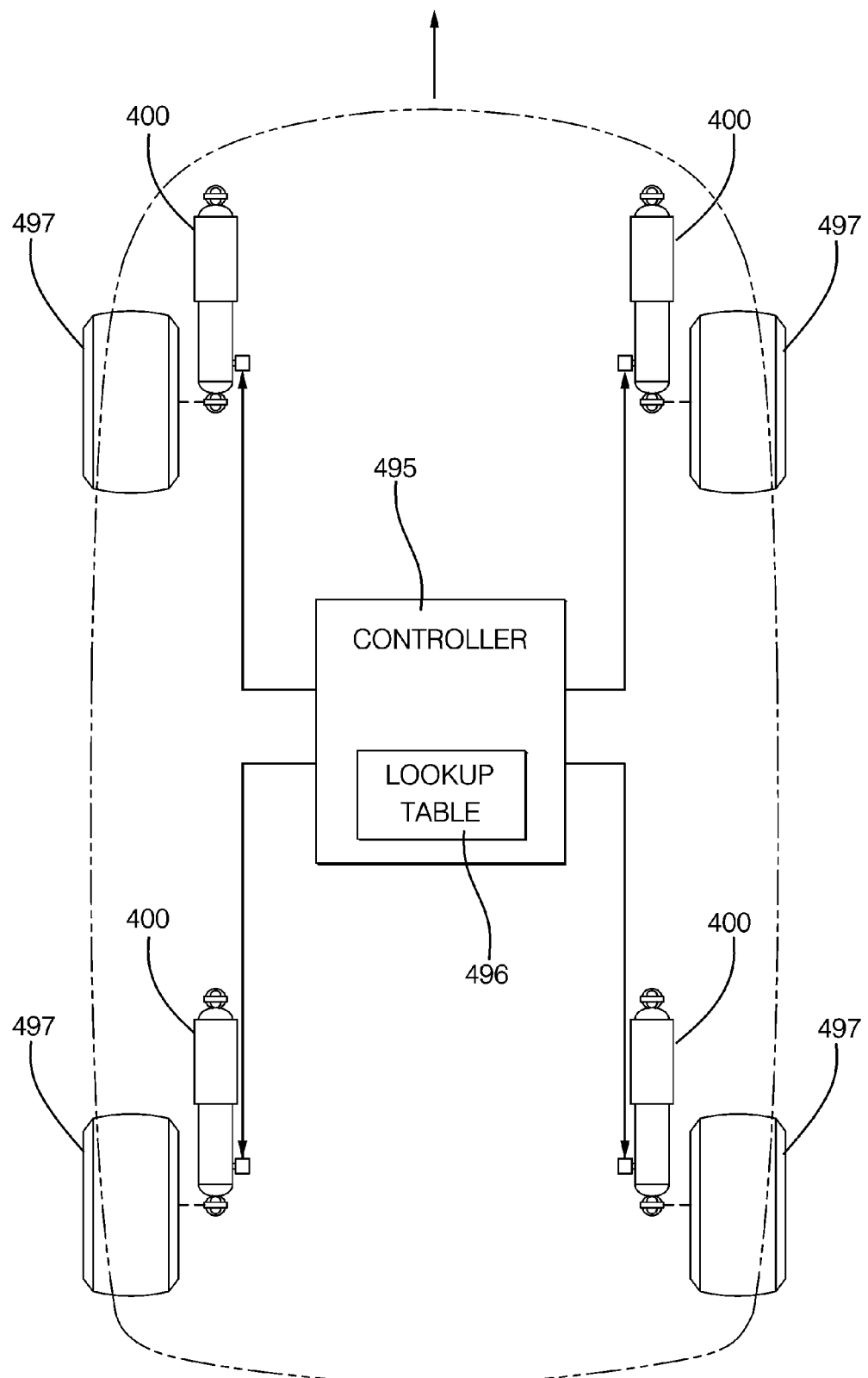
FIG. 15 shows a suspension system in a vehicle that includes the MR damper of FIG. 4 according to an alternate embodiment of the present invention.

Another alternate embodiment for the MR damper may be an application as a shock absorber in a suspension system of an apparatus that includes wheels used in transportation. The transportation apparatus may be an airplane, automobile, golf cart, motorcycle, or other type of vehicle. In a vehicle application, the MR damper that includes the primary channel MR piston assembly including the secondary channel may progressively diminish, or completely eliminate undesired vehicle structure oscillations from being sensed by an occupant of the vehicle across the velocity range of the assembly. Referring to FIG. 15, a MR suspension system is disposed in a vehicle with a primary channel MR damper 400 including the secondary channel is associated to each wheel 497 on the vehicle. The MR damper at each wheel is in electrical connection to a controller 595 that includes a look-up table 496 and provides a unique damper force-versus-MR piston assembly performance curve independently for each wheel over the knee-point range of MR damper 400. Thus, the unique suspension requirements for each wheel are met and an independent suspension system for the vehicle may be realized. The embodiment of FIG. 15 is an application of the embodiment of FIG. 12 that was presented previously herein. Alternately, the controller may use values from the look-up table to apply the same damper force-versus-MR piston assembly performance curve to both front wheels, and a different damper force-versus-MR piston assembly performance curve to both rear wheels dependent on the necessary damping needs of each set of wheels. In yet a further embodiment, the controller may apply the same damper force-versus-MR piston assembly performance curve from the look-up table simultaneously to all four wheels on the vehicle.

Figure 16:
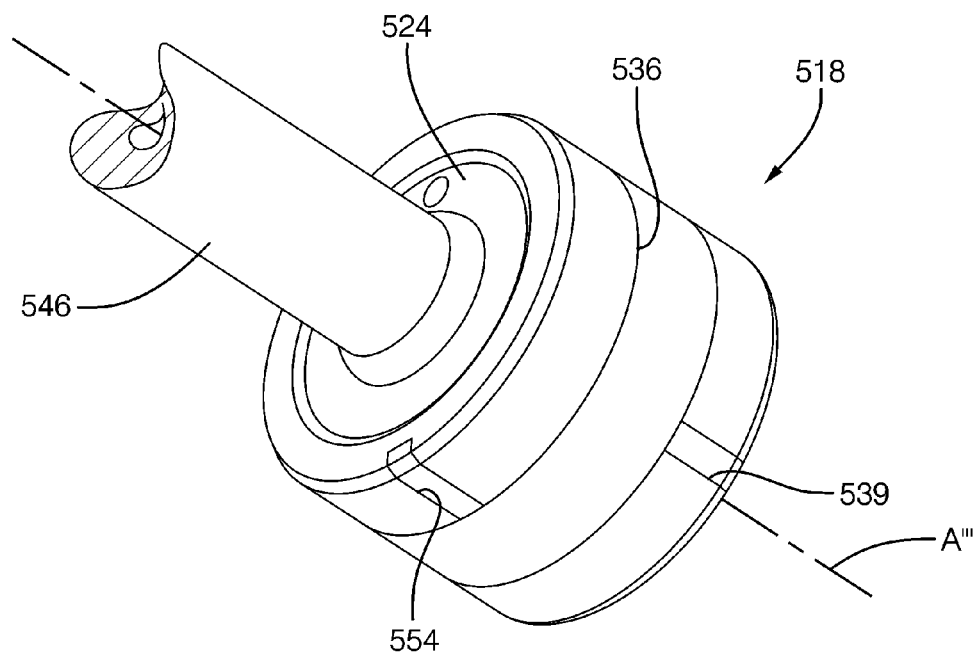
FIG. 16 shows a piston body with a secondary channel that is axially aligned and offset from the primary channel according to an alternate embodiment of the present invention.
Figure 17:
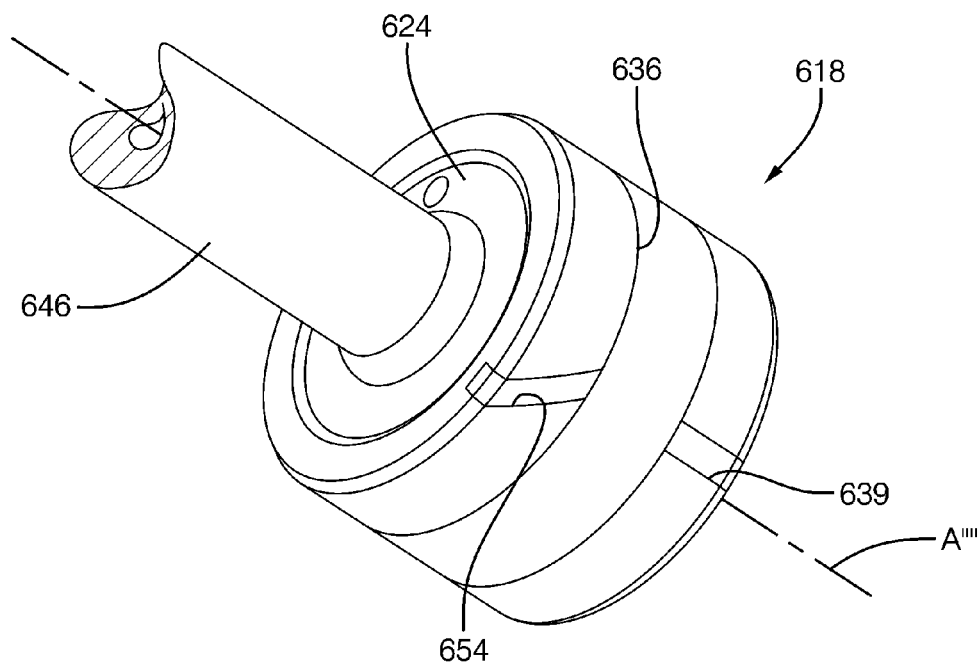
FIG. 17 shows a secondary channel disposed in a piston body that is not axially aligned with the primary channel according to an alternate embodiment of the present invention.

It is also to be understood that the invention is not limited to a primary channel and a secondary channel being in alignment on the piston body as shown in the embodiment of FIG. 3 as discussed previously herein. Some MR damper applications may be suitable for alternate arrangements of the secondary channel in relation to the primary channel to meet particular performance requirements. In a further alternate embodiment, referring to FIG. 16, a primary channel 539 and a secondary channel 554 are axially aligned with longitudinal axis A''' through a piston body 518 and rod 546. Primary channel 539 and secondary channel 554 are separated by circumferential coil groove 536. Primary and secondary channel 539, 554 are axially aligned, however, secondary channel 554 is radially offset from primary channel 539 about axis A'''. Thus, secondary channel 554 has an angle of rotation about axis A''' away from primary channel 539. Secondary channel is disposed from coil groove 536 to first end 524 on the outer body surface of piston body 518. In yet a further alternate embodiment, referring to FIG. 17, secondary channel 654 is spaced apart from axis A'''' through piston body 618 and rod 646. Secondary channel 654 veers in an angular direction from the axial direction starting at coil groove 636 and ending at first end 624. Alternately, secondary channel may be defined in the outer body surface of the piston body in a configuration starting at the coil groove and coming to an end before reaching the first end of the piston body. It is to be understood that the secondary channel may be formed in any disposition in the outer channel surface of the piston body from the coil groove toward/to the first end of the piston body.

While not limited to any particular theory it is believed that, upon inclusion of the secondary channel improves low primary channel MR piston assembly performance. The inclusion of the secondary channel allows for elimination or reduction of the nonmagnetizable hydraulic by-pass holes with their negative impact on force. This is especially the case at very low piston velocities where high forces are needed for effective damping control. The primary and secondary channels are most effective when axially aligned to minimize the breakaway force (force intercept).

It is theorized that other secondary channel dispositions and lengths apart from axial alignment of the primary and secondary channel with the secondary channel length being from the coil groove to the first end provide less optimal results than described herein. This less optimal performance is due to the change in flow direction of the MR-fluid that is required at breakaway when the channels are not aligned.

Several benefits and advantages are derived from one or more of the embodiments expressed herein. Defining the secondary channel in the piston body of the primary channel MR piston assembly provides for improved MR damper force performance at low primary channel MR piston assembly velocities. The addition of the secondary channel allows for a lower y-intercept point subsequently followed by a generally positive single-sloped incline ramp at low primary channel MR piston assembly velocities. The low y-intercept point and generally positive single-sloped incline ramp produce a higher force capability at low damper velocity that has a significant impact on vehicle handling. The addition of a single by-pass hole in a primary channel MR piston assembly allows for a further decrease in the y-intercept point while increasing the low primary channel MR primary assembly velocity range or knee point. Utilization of the secondary channel in a primary channel MR piston assembly may decrease the necessity for multiple by-pass holes to meet MR damper requirement in an application. A controller in electrical connection with the primary channel MR piston assembly may access a look-up table that provides values that represent characterization of a primary channel MR piston assembly that includes at least one of plurality of by-pass holes. This allows for enhanced dynamic performance operability without the actual need to implement by-pass holes in the primary channel MR damper assembly.

While this invention has been described in terms of the preferred embodiments thereof, it is not intended to be so limited. Various changes and modifications may be made without departing from the spirit and scope of the present invention. For example, the primary channel MR piston assembly including the piston body is not limited to any particular design, configuration, shape, size, or arrangement. Specifically, the substantially magnetically energizable passageway, the substantially magnetically non-energizable passageway (bypass holes), openings in the rod and piston body, and the corresponding configuration, size, shape, geometry, location, orientation, and number of these constituent elements may vary without limiting the utility of the present invention.

Upon reading the specification and reviewing the drawings hereof, it will become immediately obvious to those skilled in the art that a myriad of other embodiments of the present invention are possible, and that such embodiments are contemplated and fall within the scope of the presently claimed invention. The scope of the present invention is indicated in the claims that follow, and all changes that come within the meaning and range of equivalents are intended to be embraced therein.

We claim:

1. A magnetorheological damper assembly comprising;
    a cylinder extending along an axis for containing a magnetorheological fluid,
    a piston assembly slideably disposed in said cylinder and extending along said axis and separating said cylinder into a first chamber and a second chamber for sliding and reciprocal movement along said axis,
    said piston assembly including a piston body extending along said axis between a first end and a second end,
    said piston assembly defining an MR-fluid passageway extending between said first chamber and said second chamber for passing the magnetorheological fluid therethrough during said movement of said piston assembly,
    said piston body defining an outer body surface,
    said outer body surface defining at least one circumferential groove extending annularly thereabout,
    an electrical coil disposed in said circumferential groove and extending annularly about said piston body for selectively generating a magnetic field across said MR-fluid passageway to change the viscosity of the magnetorheological fluid passing through said MR-fluid passageway to increase or decrease the damping force of the magnetorheological damper assembly,
    said outer body surface further defining a first primary channel including a first primary channel first portion extending axially from said circumferential groove toward said second end of said piston body and extending radially inwardly to define a first primary channel first portion depth and defining a first portion width extending at least partially circumferentially about said piston body,
    a first segment of non-magnetic material being disposed in said first primary channel first portion for sealing said first primary channel first portion and for reducing the magnetic field passing across said MR-fluid passageway adjacent said first primary channel first portion,
    said outer body surface further defining a secondary channel extending from said circumferential groove toward said first end of said piston body to define a secondary channel length and extending radially inwardly to define a secondary channel depth and having a secondary channel width extending at least partially circumferentially about said piston body,
    said secondary channel extending from said circumferential groove to said first end of said piston body for reducing the magnetic field passing across said MR-fluid passageway adjacent said secondary channel.

2. The magnetorheological damper assembly as set forth in claim 1 and further including a second segment of non-magnetic material disposed in said secondary channel for sealing said secondary channel and for reducing the magnetic field passing across said MR-fluid passageway adjacent said secondary channel.

3. The magnetorheological damper assembly as set forth in claim 2 including said second segment of non-magnetic material being magnetically different than said electrical coil.

4. The magnetorheological damper assembly as set forth in claim 1 and further defined by said secondary channel depth being equal to said first primary channel first portion depth.

5. The magnetorheological damper assembly as set forth in claim 1 and further defined by said secondary channel width being equal to said first primary channel first portion width.

6. The magnetorheological damper assembly as set forth in claim 1 and further defined by said secondary channel extending parallel to said axis.

7. The magnetorheological damper assembly as set forth in claim 1 and further defined by said secondary channel being axially aligned with said first primary channel first portion.

8. The magnetorheological damper assembly as set forth in claim 1 and further defined by said secondary channel extending toward said first end of said piston at an angle with said axis.

9. The magnetorheological damper assembly as set forth in claim 1 and further defined by said piston assembly defining at least one non-energizeable MR-fluid passageway extending between said first chamber and said second chamber radially inwardly from said MR-fluid passageway for passing the magnetorheological fluid therethrough during said movement of said piston assembly.

10. The magnetorheological damper assembly as set forth in claim 1 and further including a controller electrically connected with said electrical coil for controlling the magnetic field generated by said electromagnets,
a memory electrically connected with said controller for storing data for allowing said controller to access said data,
said data stored on said memory including a look-up-table including a plurality of damper force-versus-primary channel MR piston assembly velocity curves for operatively controlling the magnetic field generated by said electrical coil to operate the magnetorheological damper at predetermined damping forces and velocities defined by said damper force-versus-primary channel MR piston assembly velocity curves,
said plurality of damper force-versus-primary channel MR piston assembly velocity curves extending along a plot defining an X-axis axis and a Y-axis extending transversely from said X-axis,
said plot defining an axis interception point where said X and Y axes intersect,
said plot defining a plurality of piston velocity values ranging from 0 m/s at said axis interception point to a predetermined velocity value at a location spaced from said axis interception point along said X-axis,
said plot further defining a plurality of damping force values ranging from 0 N at said axis interception point to a predetermined damping force value at a location spaced from said axis intercept point along said Y-axis,
said plurality of damper force-versus-primary channel MR piston assembly velocity curves including an initial damper force-versus-primary channel MR piston assembly velocity curve defining an initial Y-intercept point at 0 m/s and a predetermined damping force and an initial knee-point at a predetermined velocity value and a predetermined damping force value,
said plurality of damper force-versus-primary channel MR piston assembly velocity curves further including at least one characterized damper force-versus-primary channel MR piston assembly velocity curve each defining a characterized Y-intercept point where said characterized damper force-versus-primary channel MR piston assembly velocity curve intersects with said Y-axis spaced below said initial Y-intercept point and a characterized knee-point having greater velocity than said initial knee-point.

11. The magnetorheological damper assembly as set forth in claim 1 and further including said at least one circumferential groove being a first circumferential groove and a second circumferential groove being axially spaced from said first circumferential groove.

12. The magnetorheological damper assembly as set forth in claim 11 and further including said first circumferential groove defined by said piston body adjacent to said first end of said piston body said second circumferential groove defined by said piston body adjacent to said second end of said second end of said piston body.

13. The magnetorheological damper assembly as set forth in claim 11 and further including one of said electrical coil being disposed in each of said first and second circumferential grooves.

14. The magnetorheological damper assembly as set forth in claim 13 and further including said piston body defining a second primary channel extending between said first and second circumferential grooves and a third non-magnetic material segment disposed in said second primary channel for reducing the magnetic field passing across said MR-fluid passageway adjacent said second primary channel.

15. A magnetorheological damper comprising;
a cylinder having a generally tubular shape including a cylindrical wall extending along an axis and for containing a magnetorheological fluid,
a piston assembly slideably disposed in said cylinder and having a generally cylindrical shape and extending along said axis and separating said cylinder into a first chamber and a second chamber for sliding and reciprocal movement along said axis,
said piston assembly including a piston body having a generally cylindrical shape extending along said axis between a first end and a second end,
said piston body defining an outer body surface,
said piston body defining a coaxial hole extending axially therethrough between said first and second ends,
said piston assembly further including a coaxial rod having a cylindrical shape and interconnected with and extending axially away from said first end of said piston for axially moving with said piston body,
a retention ring disposed annularly about said piston rod and sealingly engaging said piston rod and said first end of said piston for sealingly interconnecting said piston rod and said piston body,
said coaxial rod defining a coaxial opening extending axially through said coaxial rod and connected with said coaxial hole of said piston,
said piston assembly further including a first end plate generally having a ring-shape disposed annularly about said coaxial road and said retention ring and fixedly engaging said first end of said piston body,
said piston assembly further including a second end plate generally having a disc-shape disposed coaxial with and in engagement with said second end of said piston body,
said piston assembly further including a flux ring of a magnetically permeable material and having a tubular shape disposed annularly about said piston body and said first and second end plates,
said piston assembly defining an MR-fluid passageway extending annularly about said axis between said piston body and said flux ring and extending axially through said first end plate and said second end plate to fluidly connecting said first and second chambers for passing the magnetorheological fluid therethrough during said movement of said piston assembly,
said piston assembly further defining at least one non-MR-fluid passageway spaced annularly about said axis and extending parallel to said axis through said piston body and said first and second end plates,
said outer body surface defining at least one circumferential groove extending annularly about said piston body,
an electrical coil disposed in said circumferential groove and extending annularly about said piston body for selectively generating a magnetic field across said MR-fluid passageway to change the viscosity of the magnetorheological fluid passing through said MR-fluid passageway to increase or decrease the damping force of the magnetorheological damper assembly,
a controller electrically connected with said electrical coil for controlling the magnetic field generated by said electromagnets,
said outer body surface of said piston defining a first primary channel generally having an L-shaped cross-section for reducing the magnetic field passing across said MR-fluid passageway adjacent said first primary channel, said first primary channel defining a first primary channel first portion extending parallel to said axis from said circumferential groove to said second end to define a first primary channel first portion length and extending radially inwardly to define a first primary channel first portion depth and having a first portion width extending at least partially circumferentially about said outer body surface, said first primary channel defining a first primary channel second portion extending radially inwardly from said outer body surface of said piston at said piston second end to said coaxial hole of said piston body, a first electrical conductor segment extending through said coaxial opening of said coaxial rod and through said coaxial hole of said piston body and through said primary channel to said electrical coil for powering said electrical coil, a first segment of non-magnetic material disposed in said primary channel and surrounding said first electrical conductor for sealing said electrical conductor and said electrical coil and for reducing the magnetic field passing across said MR-fluid passageway adjacent said first primary channel, a memory electrically connected with said controller for storing information for allowing said controller to access said information, said information stored on said memory including a look-up-table including a plurality of damper force-versus-primary channel MR piston assembly velocity curves for operatively controlling the magnetic field generated by said electrical coil to operate the magnetorheological damper at predetermined damping forces and velocities defined by said damper force-versus-primary channel MR piston assembly velocity curves, said plurality of damper force-versus-primary channel MR piston assembly velocity curves extending along a plot defining an X-axis axis and a Y-axis extending transversely from said X-axis, said plot defining an axis interception point where said X and Y axes intersect, said plot defining a plurality of piston velocity values ranging from 0 m/s at said to a predetermined velocity value at a location spaced from said axis interception point along said X-axis, said plot further defining a plurality of damping force values ranging from 0 N at said axis interception point to a predetermined damping force value at a location spaced from said axis intercept point along said Y-axis, said plurality of damper force-versus-primary channel MR piston assembly velocity curves including an initial damper force-versus-primary channel MR piston assembly velocity curve defining an initial Y-intercept point at 0 m/s and a predetermined damping force and an initial knee-point at a predetermined velocity value and a predetermined damping force value, said plurality of damper force-versus-primary channel MR piston assembly velocity curves further including at least one characterized damper force-versus-primary channel MR piston assembly velocity curve each defining a characterized Y-intercept point where said characterized damper force-versus-primary channel MR piston assembly velocity curve intersects with said Y-axis spaced below said initial Y-intercept point and a characterized knee-point having greater velocity than said initial knee-point, said outer body surface further defining a secondary channel extending from said circumferential groove toward said first end of said piston body and extending radially inwardly to define a secondary channel depth and having a secondary channel width extending at least partially circumferentially about said piston body for reducing the magnetic field passing across said MR-fluid passageway adjacent said secondary channel, said secondary channel extending from said circumferential groove to said first end of said piston body for reducing the magnetic field passing across said MR-fluid passageway adjacent said secondary channel, a second segment of non-magnetic material being disposed in said secondary channel for sealing said secondary channel and for reducing the magnetic field passing across said MR-fluid passageway adjacent said secondary channel, said second segment of non-magnetic material being magnetically different than said electrical coil, said secondary channel depth being equal to said first primary channel first portion depth, said secondary channel width being equal to said first primary channel first portion width.

16. The magnetorheological damper assembly as set forth in claim 15 and further including said at least one circumferential groove being a first circumferential groove defined by said piston body adjacent to said first end of said piston body and a second circumferential groove defined by said piston body and axially spaced from said first circumferential groove and adjacent to said second end of said piston body, said electrical coil being a first electrical coil disposed in said first circumferential groove and extending annularly about said piston body and a second electrical coil disposed in said second circumferential groove and extending annularly about said piston body, said piston body defining a second primary channel extending parallel to said axis between said first and second circumferential grooves for reducing the magnetic field passing across said MR-fluid passageway adjacent said second primary channel, a third non-magnetic material segment disposed in said second primary channel for sealing said second primary channel and for reducing the magnetic field passing across said MR-fluid passageway adjacent said second primary channel, a second electrical conductor segment extending between said first electrical coil and said second electrical coil.

17. The magnetorheological damper assembly as set forth in claim 15 and further defined by said secondary channel extending parallel to said axis.

18. The magnetorheological damper assembly as set forth in claim 15 and further defined by said secondary channel being axially aligned with said primary channel.

19. The magnetorheological damper assembly as set forth in claim 15 and further defined by said secondary channel extending toward said first end of said piston at an angle with said axis.

* * * * *

UNITED STATES PATENT AND TRADEMARK OFFICE
CERTIFICATE OF CORRECTION

PATENT NO. : 8,327,984 B2  
APPLICATION NO. : 12/609395  
DATED : December 11, 2012  
INVENTOR(S) : Robert T. Foister et al.

Page 1 of 1

It is certified that error appears in the above-identified patent and that said Letters Patent is hereby corrected as shown below:

On the Title Page  
Item (75) Inventors "Oilver" should read --Olivier--.  
(75) Inventors "Senils" should read --Senlis--.

Signed and Sealed this  
Seventeenth Day of March, 2015

Michelle K. Lee  
*Director of the United States Patent and Trademark Office*